United States Patent
Matsumoto et al.

(10) Patent No.: US 12,261,947 B2
(45) Date of Patent: Mar. 25, 2025

(54) LEARNING SYSTEM, LEARNING METHOD, AND COMPUTER PROGRAM PRODUCT

(71) Applicant: KABUSHIKI KAISHA TOSHIBA, Tokyo (JP)

(72) Inventors: Mari Matsumoto, Kawasaki Kanagawa (JP); Masanori Furuta, Odawara Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1072 days.

(21) Appl. No.: 17/180,707

(22) Filed: Feb. 19, 2021

(65) Prior Publication Data

US 2022/0004815 A1 Jan. 6, 2022

(30) Foreign Application Priority Data

Jul. 1, 2020 (JP) ................................ 2020-113824

(51) Int. Cl.
*H04L 9/08* (2006.01)
*G06F 18/214* (2023.01)
(Continued)

(52) U.S. Cl.
CPC .......... *H04L 9/085* (2013.01); *G06F 18/2148* (2023.01); *G06N 3/063* (2013.01); *G06N 5/04* (2013.01)

(58) Field of Classification Search
CPC ..... H04L 9/085; G06F 18/2148; G06N 3/063; G06N 5/04
See application file for complete search history.

(56) References Cited

U.S. PATENT DOCUMENTS

2018/0018590 A1* 1/2018 Szeto .................... G16H 50/20

FOREIGN PATENT DOCUMENTS

| JP | H4-149663 A | 5/1992 |
|----|-------------|--------|
| JP | 2017-207839 A | 11/2017 |

(Continued)

OTHER PUBLICATIONS

Sun, Jingwei, et al. "Provable defense against privacy leakage in federated learning from representation perspective." arXiv preprint arXiv:2012.06043 (2020). (Year: 2020).*

(Continued)

*Primary Examiner* — Li B. Zhen
*Assistant Examiner* — Griffin Tanner Bean
(74) *Attorney, Agent, or Firm* — Finnegan, Henderson, Farabow, Garrett & Dunner, LLP

(57) ABSTRACT

A learning system according to an embodiment includes a model generation device and n calculation devices. The model generation device includes a splitting unit, a secret sharing unit, and a share transmission unit. The splitting unit splits m×n pieces of training data into n groups each including m training data pieces, the n groups corresponding to the respective n calculation devices on one-to-one basis. The secret sharing unit generates m distribution training data pieces for each of the n groups by distributing using a secret sharing scheme and generates distribution training data for each of the m training data pieces in an i-th group among the n groups, using an i-th element Pi among n elements P1, P2, ..., Pi, ..., Pn, by distributing using the secret sharing scheme. The share transmission unit transmits corresponding m distribution training data pieces to each of the n calculation devices.

9 Claims, 16 Drawing Sheets

(51) Int. Cl.
G06N 3/063 (2023.01)
G06N 5/04 (2023.01)

(56) References Cited

FOREIGN PATENT DOCUMENTS

| | | |
|---|---|---|
| JP | 2018-206016 A | 12/2018 |
| JP | 2019-144405 A | 8/2019 |
| JP | 6556659 B2 | 8/2019 |

OTHER PUBLICATIONS

Catak, Ferhat Ozgur, et al. "Practical implementation of privacy preserving clustering methods using a partially homomorphic encryption algorithm." Electronics 9.2 (2020): 229. (Year: 2020).*
Nishida, Naohisa et al., "Efficient Secure Binarized CNN Protocol Reducing Accuracy Degradation," Computer Security Symposium, Oct. 21-24, 2019, pp. 1588-1595 (2019).
Wagh, Sameer et al., "SecureNN: 3-Party Secure Computation for Neural Network Training," Privacy Enhancing Technologies Symposium (PETS), 24 pages (2019).

* cited by examiner

LEARNING SYSTEM, LEARNING METHOD, AND COMPUTER PROGRAM PRODUCT

CROSS-REFERENCE TO RELATED APPLICATIONS

This application is based upon and claims the benefit of priority from Japanese Patent Application No. 2020-113824, filed on Jul. 1, 2020; the entire contents of which are incorporated herein by reference.

FIELD

Embodiments described herein relate generally to a learning system, a learning method, and a computer program product.

BACKGROUND

In recent years, advanced telecommunications services using personal information, cloud services such as storing business information in remote servers, and the like have been provided. For example, services that provide users with information matching the preference of each user by using personal information, services capable of predicting a failure based on various types of sensor information from factory machines, and the like have been offered. One of the ways for implementing these services is a method using machine learning.

In recent years, large-scale machine learning computations are sometimes entrusted to cloud service providers. However, when the machine learning computations are entrusted to the cloud service providers, there are risks that training data may be leaked, and that a trained learning model may be leaked.

A secret calculation technique, which performs calculation while keeping secrecy of input information, has been studied. By using the secret calculation technique, it is possible to entrust the cloud service providers to execute machine learning, while keeping secrecy of training data and a learning model.

The secret calculation method is broadly divided into a homomorphic encryption method and a secret sharing scheme. In general, the computation amount is increased in the homomorphic encryption method than in the secret sharing scheme. On the other hand, the secret sharing scheme generally requires three or more separately managed devices, and the scale of the system is enlarged in the secret sharing scheme than that of the homomorphic encryption method. Thus, to execute the machine learning that is kept secret by the secret sharing scheme, it is preferable to perform the machine learning with a small computation amount as much as possible.

Embodiments herein provide a learning system, a learning method, and a computer program product capable of training a learning model with a small computation amount, while keeping secrecy of training data and a parameter group of the learning model.

A learning system according to embodiments trains a learning model. The learning system includes a model generation device and n pieces (n is an integer equal to or greater than three) of calculation devices. The n pieces of calculation devices are connected to the model generation device via a network.

The model generation device includes an acquisition unit, a splitting unit, a secret sharing unit, and a share transmission unit. The acquisition unit acquires m×n pieces (m is an integer equal to or greater than two) of training data used for training the learning model. The splitting unit splits the m×n pieces of training data into n pieces of groups (i.e., n groups) including m pieces of training data, corresponding to the n pieces of calculation devices on one-to-one basis. The secret sharing unit generates m pieces of distribution training data for each of the n pieces of groups by a distribution process of a secret sharing scheme, and generates distribution training data for each of the m pieces of training data included in an i-th group (i is an integer equal to or greater than one and equal to or less than n) among the n pieces of groups, using an i-th element (Pi) among n pieces of elements (P1, P2, ..., Pi, ..., Pn) by the distribution process of the secret sharing scheme. The share transmission unit transmits the corresponding m pieces of distribution training data to each of the n pieces of calculation devices.

Each of the n pieces of calculation devices includes a share reception unit, a training unit, and a parameter transmission unit. The share reception unit receives the m pieces of distribution training data from the model generation device. The training unit trains a distributed learning model having a configuration same as that of the learning model, by the received m pieces of distribution training data. The parameter transmission unit transmits a trained distribution parameter group in the distributed learning model to the model generation device.

The model generation device further includes a parameter reception unit and a parameter restoration unit. The parameter reception unit receives the trained distribution parameter group from each of k1 pieces (k1 is a predetermined integer equal to or greater than two and equal to or less than n−1) of calculation devices among the n pieces of calculation devices. The parameter restoration unit generates a parameter group of the learning model, based on the distribution parameter group received from each of the k1 pieces of calculation devices, by a restoration process of the secret sharing scheme.

DETAILED DESCRIPTION

A learning system according to an embodiment for training a learning model includes a model generation device and n pieces of calculation devices connected to the model generation device via a network, where n is an integer equal to or greater than three. The model generation device includes a first hardware processor configured to function as an acquisition unit, a splitting unit, a secret sharing unit, and a share transmission unit. The acquisition unit acquires m×n pieces of training data used for training the learning model, where m is an integer equal to or greater than two. The splitting unit splits the m×n pieces of training data into n groups each including m pieces of training data, where the n groups corresponds to the respective n pieces of calculation devices on one-to-one basis. The secret sharing unit generates m pieces of distribution training data for each of the n groups by a distribution process of a secret sharing scheme, and generates distribution training data for each of the m pieces of training data included in an i-th group, where i is an integer equal to or greater than one and equal to or less than n, among the n groups using an i-th element $P_i$ among n pieces of elements $P_1, P_2, \ldots, P_i, \ldots, P_n$, by the distribution process of the secret sharing scheme. The share transmission unit transmits the corresponding m pieces of distribution training data to each of the n pieces of calculation devices. Each of the n pieces of calculation devices includes a second hardware processor configured to function as a share reception unit, a training unit, and a parameter transmission. The share reception unit receives the m pieces of distribution training data from the model generation device. The training unit trains a distributed learning model having a configuration same as a configuration of the learning model, by the received m pieces of distribution training data. The parameter transmission unit transmits a trained distribution parameter group in the distributed learning model to the model generation device. The first hardware processor of the model generation device is further function as a parameter reception unit, and a parameter restoration unit. The parameter reception unit receives the trained distribution parameter group from each of k1 pieces of calculation devices, where k1 is a predetermined integer equal to or greater than two and equal to or less than n−1, among the n pieces of calculation devices. The parameter restoration unit generates a parameter group of the learning model, based on the distribution parameter group received from each of the k1 pieces of calculation devices, by a restoration process of the secret sharing scheme. Hereinafter, a learning system 10 according to embodiments will be described in detail with reference to the accompanying drawings.

First Embodiment

Figure 1:
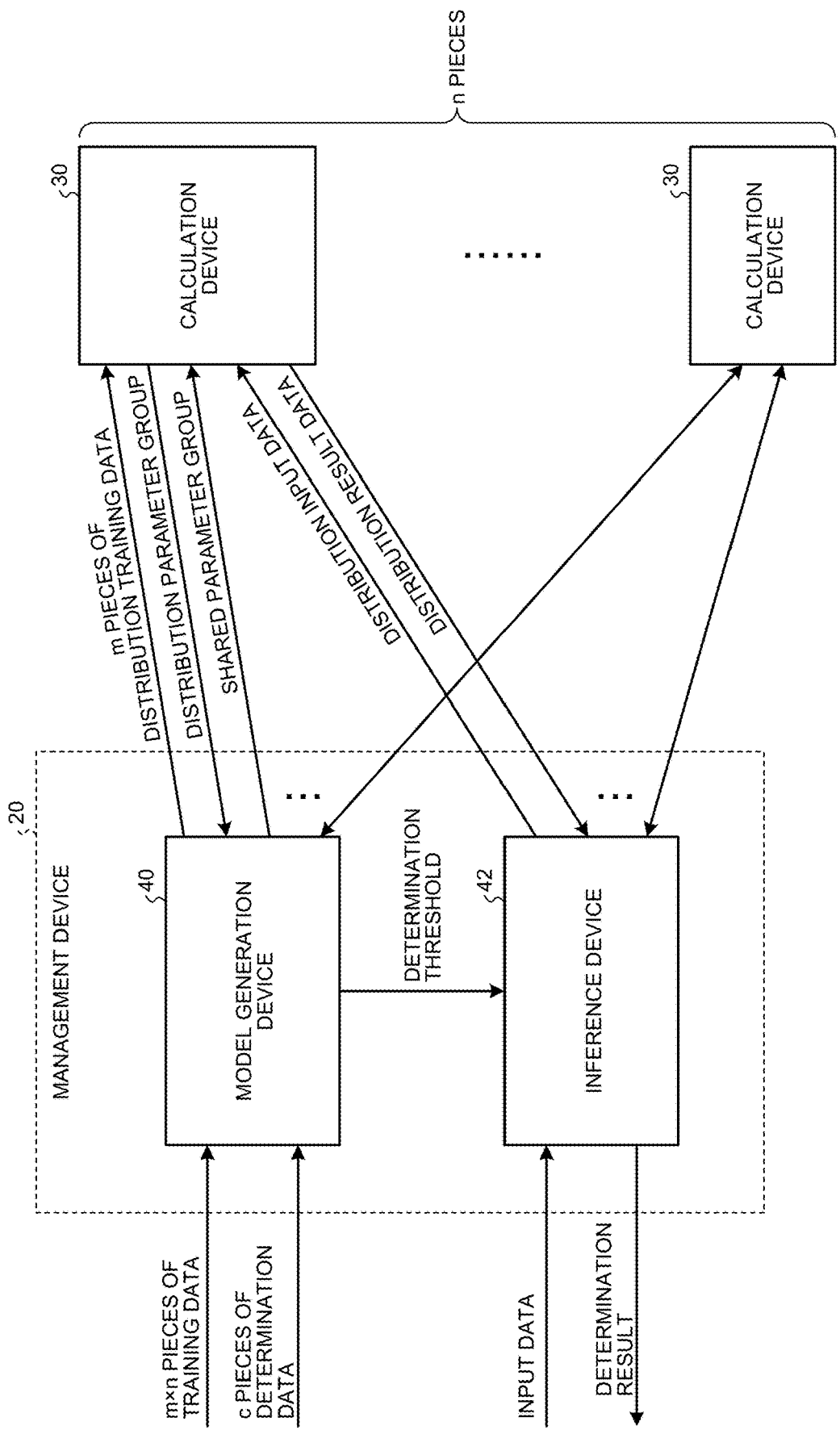
FIG. 1 is a diagram illustrating a configuration of a learning system according to a first embodiment.

FIG. 1 is a diagram illustrating a configuration of the learning system 10 according to a first embodiment. The learning system 10 according to the first embodiment trains a learning model while keeping secrecy of training data and a parameter group of the learning model, and enables the learning model to make inference while keeping secrecy of input data and result data.

The learning system 10 includes a management device 20 and n pieces (n is an integer equal to or greater than three) of calculation devices 30.

The management device 20 is implemented by an information processing device. Each of the n pieces of calculation devices 30 is implemented by an information processing device different from that of the management device 20. Each of the n pieces of calculation devices 30 is connected to the management device 20 via a network. Each of the n pieces of calculation devices 30 may be a server on the network. Each of the n pieces of calculation devices 30 may also be implemented by a cloud configured by a plurality of information processing devices on a network.

The management device 20 includes a model generation device 40 and an inference device 42.

The model generation device 40 acquires m×n pieces (m is an integer equal to or greater than two) of training data. In this example, the configuration of a learning model is determined in advance. For example, when the learning model is a neural network, the layer configuration, the number of nodes of each layer, and the like are determined in advance. In the present embodiment, the learning model is a model trained such that the input data and the output data are the same. For example, the learning model is an autoencoder. The autoencoder is a neural network with a three-layer configuration in which the number of nodes included in the input layer and the number of nodes included in the output layer are the same, and the number of nodes included in a hidden layer is smaller than the number of nodes included in the input layer and the output layer.

The model generation device 40 generates m×n pieces of distribution training data in which m×n pieces of training data are kept secret by a distribution process of a secret sharing scheme. The model generation device 40 then transmits corresponding m pieces of distribution training data among the m×n pieces of distribution training data, to each of the n pieces of calculation devices 30.

Each of the n pieces of calculation devices 30 trains a distributed learning model having a predetermined configuration, using the received m pieces of distribution training data. The distributed learning model has a configuration same as that of the learning model managed by the managing device 20. Each of the n pieces of calculation devices 30 transmits the distribution parameter group, which is a parameter group set for the distributed learning model having been trained, to the model generation device 40.

The model generation device 40 receives the distribution parameter group from each of at least k1 pieces (k1 is a predetermined integer equal to or greater than two and equal to or less than n−1) of calculation devices 30 among the n pieces of calculation devices 30. The model generation device 40 then restores the parameter group of the learning model having a predetermined configuration, from the received k1 pieces of distribution parameter groups, by a restoration process of the secret sharing scheme.

The model generation device 40 acquires c pieces (c is an integer equal to or greater than two) of determination data. The model generation device 40 generates a determination threshold using the restored parameter group and the c pieces of determination data. The model generation device 40 then supplies the generated determination threshold to the inference device 42.

The model generation device 40 also generates n pieces of shared parameter groups in which the restored parameter group of the learning model is kept secret by the distribution process of the secret sharing scheme. The model generation device 40 then transmits the corresponding shared parameter group to each of the n pieces of calculation devices 30.

The inference device 42 acquires input data. The inference device 42 generates n pieces of distribution input data in which the input data is kept secret by the distribution process of the secret sharing scheme. The model generation device 40 then transmits the corresponding distribution input data to each of the n pieces of calculation devices 30.

Each of the n pieces of calculation devices 30 calculates distribution result data from the received distribution input data, using the distributed learning model in which the received shared parameter group is set in advance. Each of the n pieces of calculation devices 30 then transmits the calculated distribution result data to the inference device 42.

The inference device 42 receives the distribution result data from each of at least k2 pieces (k2 is a predetermined integer equal to or greater than two and equal to or less than n−1) of calculation devices 30 among the n pieces of calculation devices 30. The inference device 42 then restores the result data from the received k2 pieces of distribution result data, by the restoration process of the secret sharing scheme. The result data is data inferred by the learning model on the basis of the input data.

The inference device 42 generates a determination result indicating the evaluation result of the input data, on the basis of the input data, the restored result data, and the determination threshold. The inference device 42 then outputs the determination result.

Figure 2:
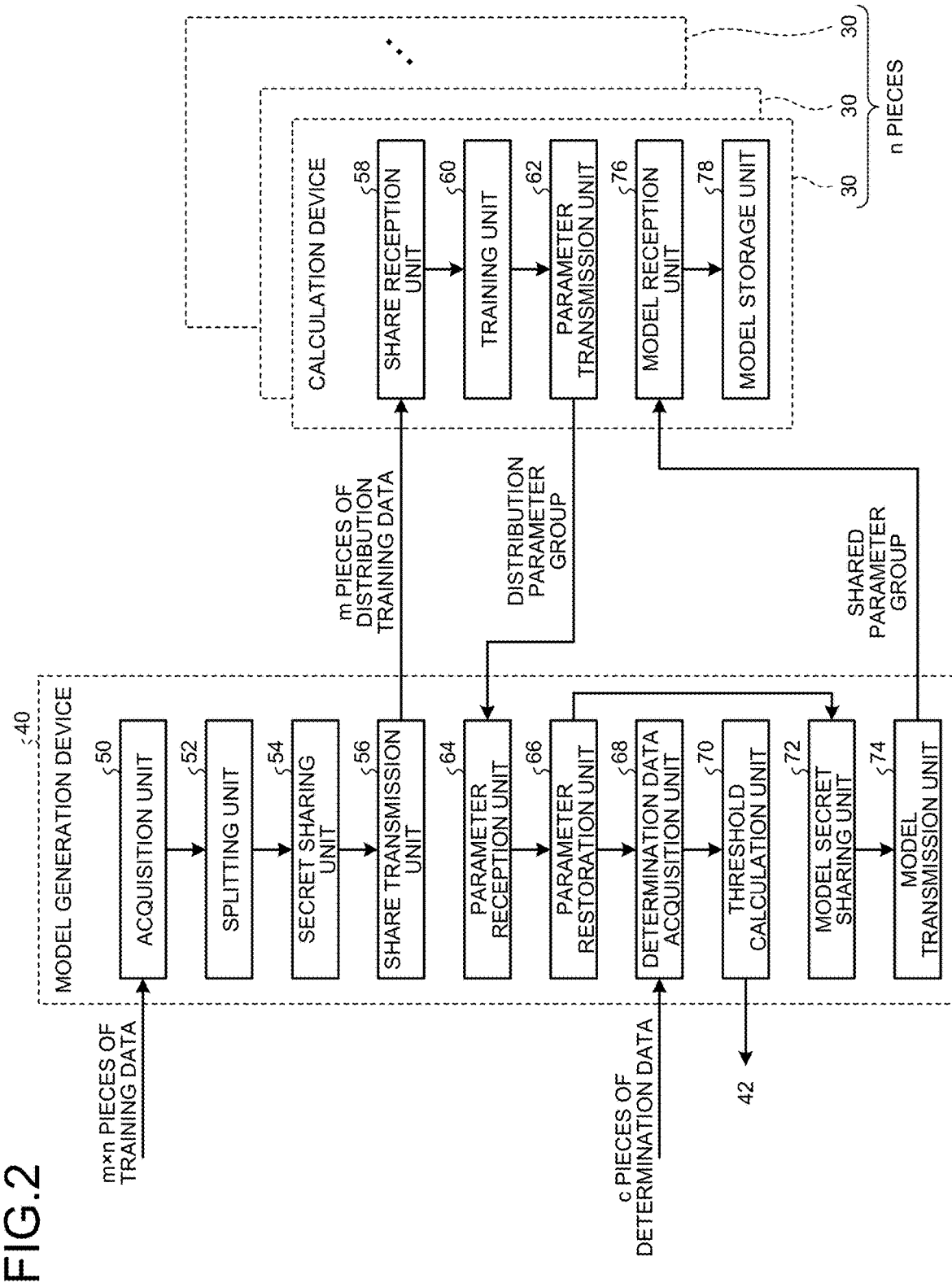
FIG. 2 is a configuration diagram of a model generation device and a calculation device according to the first embodiment during learning.

FIG. 2 is a diagram illustrating a functional configuration of the model generation device 40 and the calculation device 30 according to the first embodiment during learning.

The model generation device 40 includes an acquisition unit 50, a splitting unit 52, a secret sharing unit 54, a share transmission unit 56, a parameter reception unit 64, a parameter restoration unit 66, a determination data acquisition unit 68, a threshold calculation unit 70, a model secret sharing unit 72, and a model transmission unit 74. Each of the n pieces of calculation devices 30 includes a share reception unit 58, a training unit 60, a parameter transmission unit 62, a model reception unit 76, and a model storage unit 78.

The acquisition unit 50 acquires m×n pieces of training data. The m×n pieces of training data is a data set used for training a learning model.

For example, each of the m×n pieces of training data is data including a plurality of output values output at the same time from a plurality of sensors installed to monitor the system. The m×n pieces of training data may also be a plurality of data sets arranged in time series. To train the learning model such as to detect abnormality in the system, for example, the m×n pieces of training data are a data set of output values of a plurality of sensors when the system is operating normally, and is a data set used to detect abnormality in each of the sensors. However, the m×n pieces of training data is not limited to the data set used for training the learning model such as to detect abnormality in the system, and may be any data set.

The splitting unit 52 splits the m×n pieces of training data acquired by the acquisition unit 50 into n pieces of groups. The n pieces of groups correspond to the n pieces of calculation devices 30 on one-to-one basis. The n pieces of groups include m pieces of training data.

The secret sharing unit 54 generates the m pieces of distribution training data for each of the n pieces of groups, by the distribution process of the secret sharing scheme. In this case, the secret sharing unit 54 generates the distribution training data for each of the m pieces of training data included in the i-th group (i is any integer equal to or greater than one and equal to or less than n) among the n pieces of groups, using the i-th element ($P_i$) among n pieces of elements ($P_1, P_2, \ldots, P_i, \ldots P_n$), by the distribution process of the secret sharing scheme. By performing such a process, the secret sharing unit 54 can generate the m pieces of distribution training data corresponding to each of the n pieces of groups.

The share transmission unit 56 transmits the corresponding m pieces of distribution training data to each of the n pieces of calculation devices 30.

The share reception unit 58 of each of the n pieces of calculation devices 30 receives the m pieces of distribution training data from the model generation device 40. The training unit 60 of each of the n pieces of calculation devices 30 trains the distributed learning model having a configuration same as that of the learning model, using the received m pieces of distribution training data. The parameter transmission unit 62 of each of the n pieces of calculation devices 30 transmits the trained distribution parameter group in the distributed learning model to the model generation device 40.

The parameter reception unit 64 receives the trained distribution parameter group from each of at least k1 pieces of calculation devices 30 among the n pieces of calculation devices 30. The parameter restoration unit 66 generates a parameter group of the learning model on the basis of the k1 pieces of distribution parameter groups received from the k1 pieces of calculation devices 30, by the restoration process of the secret sharing scheme.

The determination data acquisition unit 68 acquires c pieces of determination data. The c pieces of determination data is a data set for generating a determination threshold used to evaluate an error value between data input to the learning model and data output from the learning model.

Each of the c pieces of determination data is a data set acquired in the same environment as that of the m×n pieces of training data. For example, when the m×n pieces of training data is a data set of output values of a plurality of sensors when the system is operating normally, and is a data set used to detect abnormality in the sensor, the c pieces of determination data is also the similar data set.

The threshold calculation unit 70 calculates a determination threshold by giving the c pieces of determination data to the learning model in which the parameter group generated by the restoration process of the secret sharing scheme is set. The determination threshold indicates a boundary of an error value used for determining whether the input data and the result data are the same, or determining whether the input data and the result data are not the same. The threshold calculation unit 70 supplies the determination threshold to the inference device 42.

The model secret sharing unit 72 generates n pieces of shared parameter groups for the parameter group of the learning model restored by the parameter restoration unit 66, by the distribution process of the secret sharing scheme. For example, the model secret sharing unit 72 generates n pieces of shared parameter groups for each of the parameters included in the parameter group, by the distribution process of the secret sharing scheme. The n pieces of shared parameter groups correspond to the n pieces of calculation devices 30 on one-to-one basis.

The model transmission unit 74 transmits the corresponding shared parameter group among the n pieces of shared parameter groups, to each of the n pieces of calculation devices 30.

The model reception unit 76 of each of the n pieces of calculation devices 30 receives the shared parameter group from the model generation device 40. The model storage unit 78 of each of the n pieces of calculation devices 30 stores therein the received shared parameter group.

Figure 3:
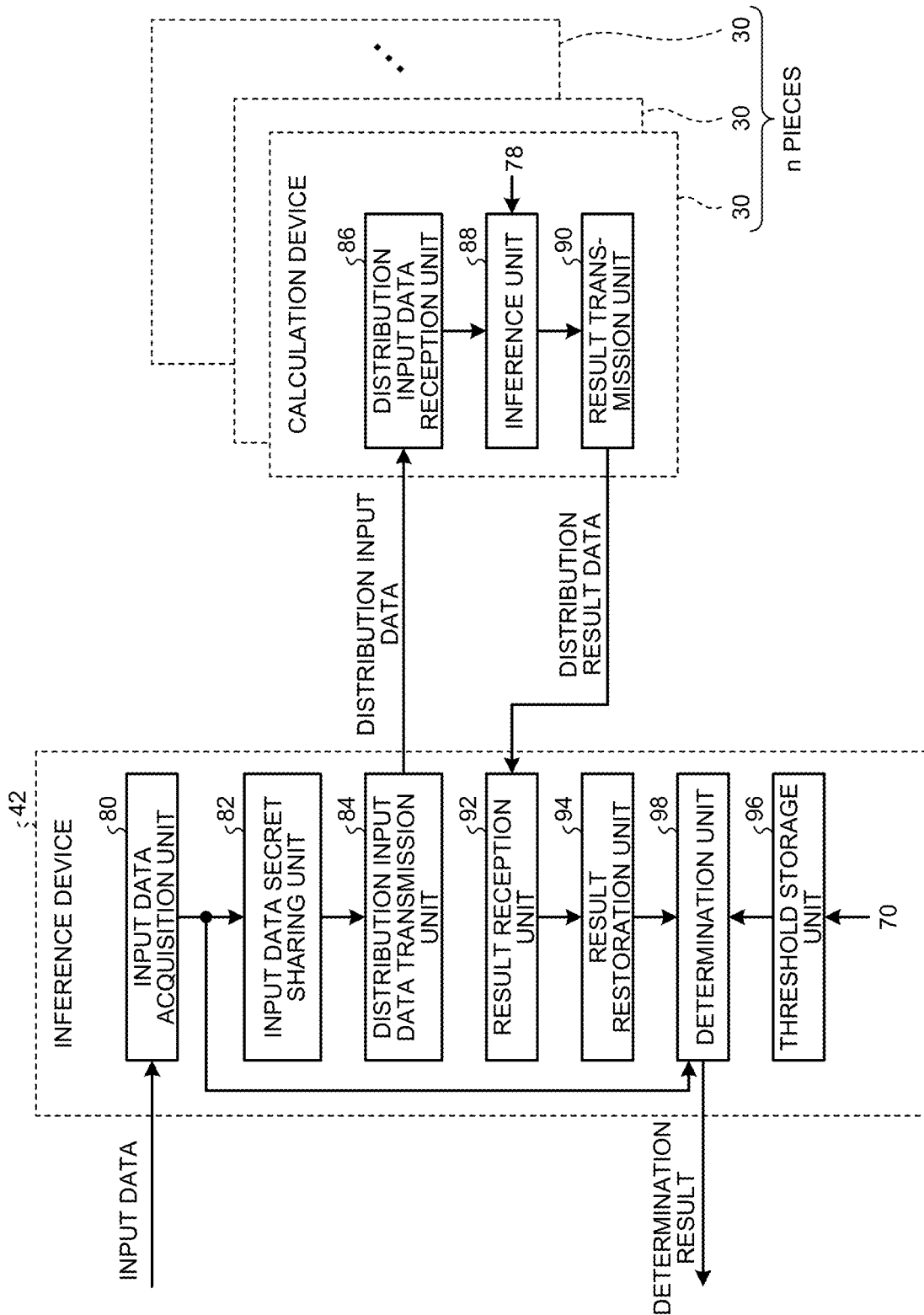
FIG. 3 is a configuration diagram of an inference device and a calculation device according to the first embodiment during inference.

FIG. 3 is a diagram illustrating a functional configuration of the inference device 42 and the calculation device 30 according to the first embodiment during inference.

The inference device 42 includes an input data acquisition unit 80, an input data secret sharing unit 82, a distribution input data transmission unit 84, a result reception unit 92, a result restoration unit 94, a threshold storage unit 96, and a determination unit 98. Each of the n pieces of calculation devices 30 further includes a distribution input data reception unit 86, an inference unit 88, and a result transmission unit 90.

In the inference process, the input data acquisition unit 80 acquires input data used to enable the learning model to make inference. The input data is data acquired from the environment from which the m×n pieces of training data is output. For example, when each of the m×n pieces of training data is data including a plurality of output values output at the same time from a plurality of sensors installed to monitor the system, the input data is also data including the output values output at the same time from the same sensors.

The input data secret sharing unit 82 generates n pieces of distribution input data for the acquired input data, by the distribution process of the secret sharing scheme. The n pieces of distribution input data correspond to the n pieces of calculation devices 30 on one-to-one basis. The distribution input data transmission unit 84 transmits the corresponding distribution input data among the n pieces of distribution input data to each of the n pieces of calculation devices 30.

The distribution input data reception unit 86 of each of the n pieces of calculation devices 30 receives the distribution input data from the inference device 42. The inference unit 88 of each of the n pieces of calculation devices 30 acquires the shared parameter group from the model storage unit 78. Then, the inference unit 88 of each of the n pieces of calculation devices 30 generates the distribution result data, on the basis of the distributed learning model in which the shared parameter group is set, and the received distribution input data. The distribution result data generated by the inference unit 88 is data corresponding to the calculation device 30 among the n pieces of distribution result data that are obtained by distributing the result data obtained by giving the input data to the learning model, by the distribution process of the secret sharing scheme. The result transmission unit 90 of each of the n pieces of calculation devices 30 transmits the distribution result data generated by the inference unit 88 to the inference device 42.

The result reception unit 92 receives the distribution result data from each of the k2 pieces of calculation devices 30 among the n pieces of calculation devices 30. The result restoration unit 94 generates result data on the basis of the k2 pieces of distribution result data received from the k2 pieces of calculation devices 30, by the restoration process of the secret sharing scheme.

The threshold storage unit 96 stores therein the determination threshold calculated by the threshold calculation unit 70 of the model generation device 40. The determination unit 98 generates a determination result indicating the evaluation result of the input data, on the basis of the input data, the restored result data, and the determination threshold.

More specifically, the determination unit 98 calculates an error value between the input data and the result data. The determination unit 98 then compares between the error value and the determination threshold. When the error value is smaller than the determination threshold, the determination unit 98 outputs a determination result indicating that the input data and the restored result data are the same. When the error value is equal to or greater than the determination threshold, the determination unit 98 outputs a determination result indicating that the input data and the restored result data are not the same. The determination unit 98 then outputs the determination result.

Figure 4:
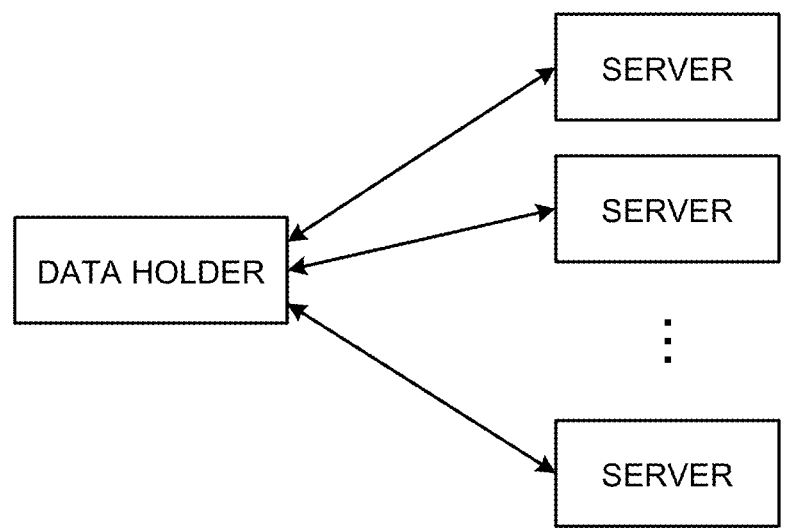
FIG. 4 is a diagram for explaining a secret sharing scheme.

FIG. 4 is a diagram for explaining the secret sharing scheme. The learning system 10 according to the present embodiment uses Shamir's threshold secret sharing scheme as the secret sharing scheme. The Shamir's threshold secret sharing scheme may also be referred to as a threshold secret sharing scheme.

In the distribution process of the threshold secret sharing scheme, n pieces of distribution data are generated from one original data, and the n pieces of distribution data are distributed and transmitted to n number of devices. In the restoration process of the threshold secret sharing scheme, a predetermined number of pieces (K pieces) of distribution data among the n pieces of distribution data are acquired, and the original data is restored on the basis of the acquired K pieces of distribution data. Symbols K and n satisfy a relation of K≤n. The threshold secret sharing scheme has a resistance against disappearance such that the original data can be restored even if (n−K) pieces of distribution data disappear, and confidentiality such that the original data cannot be restored when the distribution data is less than K pieces.

It is assumed that a data holder wishes to safely distribute and save original data (a) into n numbers of servers ($S_1$, $S_2$, ..., $S_n$) using the threshold secret sharing scheme. In this case, the data holder performs the distribution process of the secret sharing scheme as follows.

First, the data holder selects a field K to be a∈ K. Subsequently, the data holder selects (K−1) pieces (1<K≤n) of elements ($r_1, r_2, ..., r_{k-1}$) of K at random. Subsequently, the data holder generates a polynomial of degree (K−1) (W(P)) in which a symbol a is used as an intercept, as indicated in the following equation (1).

$$W(P) = \sum_{i=1}^{k-1} r_i P^i + a \quad (1)$$

Subsequently, the data holder selects n pieces of elements ($P_1, P_2, ... P_n$) of K, and calculates n pieces of polynomials (W ($P_1$), W($P_2$), ... W($P_n$)). The data holder then transmits W($P_t$) to a server $S_t$. A symbol t is any integer equal to or greater than one and equal to or less than n. In this case, the data holder does not transmit the same W($P_t$) to two different servers. W($P_t$) is distribution data of the original data (a) to be transmitted to the server $S_t$, and may also be indicated as [a]t: =W($P_t$).

By performing the process described above, the data holder can safely distribute and save the original data (a) into the n numbers of servers ($S_i, S_2, ..., S_n$) using the threshold secret sharing scheme.

Next, it is assumed that the data holder wishes to restore the original data (a) from the distribution data ([a]$_{t1}$, [a]$_{t2}$, . . . , [a]$_{tn}$) distributed and saved in the n numbers of servers (S$_1$, S$_2$, . . . , S$_n$) using the threshold secret sharing scheme. In this case, the data holder performs the following process.

First, the data holder selects K numbers of servers (St$_1$, St$_2$, . . . , St$_K$) among the n numbers of servers (S$_1$, S$_2$, . . . , S$_n$). In this case, the servers selected by the data holder are all different. Subsequently, the data holder acquires the K pieces of distribution data ([a]$_{t1}$, [a]$_{t2}$, . . . , [a]$_{tK}$) from the K numbers of servers (St$_1$, St$_2$, . . . , St$_K$).

Subsequently, the data holder calculates the following equation (2), and restores the original data (a).

$$a = \sum_{j=1}^{K} \lambda_{tj}[a]_{tj} \quad (2)$$

In equation (2), $\lambda_{tj}$ is a Lagrange coefficient used in the Lagrange interpolation method.

By performing the process described above, the data holder can restore the original data (a) from the distribution data ([a]$_{t1}$, [a]$_{t2}$, . . . , [a]$_{tn}$) distributed and saved in the n numbers of servers (S$_1$, S$_2$, . . . , S$_n$) using the threshold secret sharing scheme.

In the embodiment, the model generation device 40 executes the process corresponding to the data holder in the distribution process. Moreover, in the embodiment, the inference device 42 executes the process corresponding to the data holder in the restoration process. Furthermore, in the embodiment, each of the n pieces of calculation devices 30 executes the process corresponding to the server.

Figure 5:
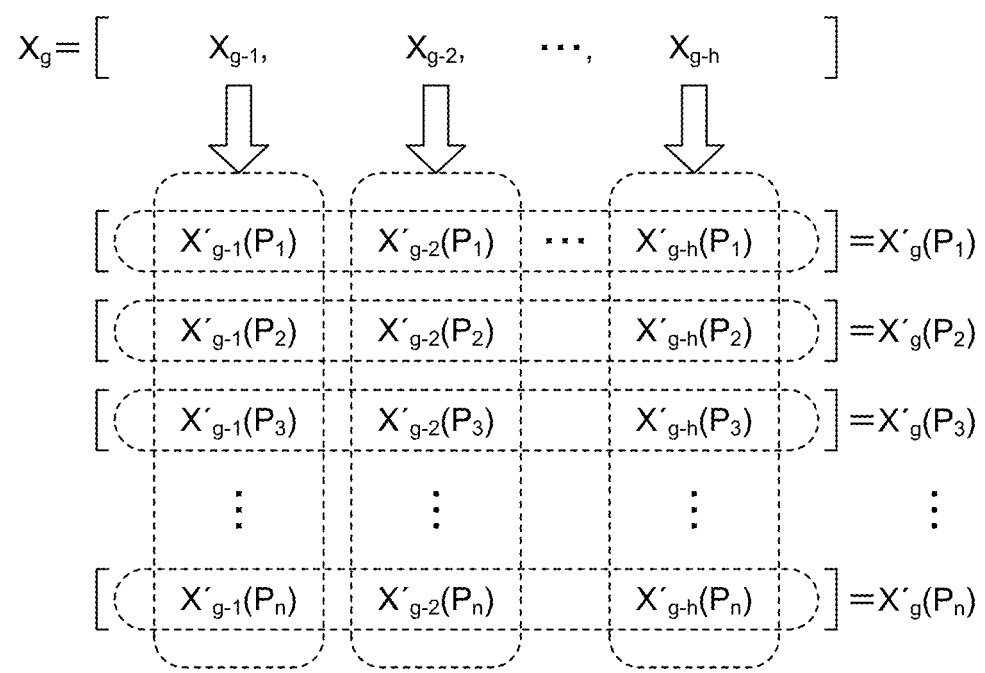
FIG. 5 is a diagram illustrating the contents of a secret sharing scheme with respect to training data.
Figure 6:
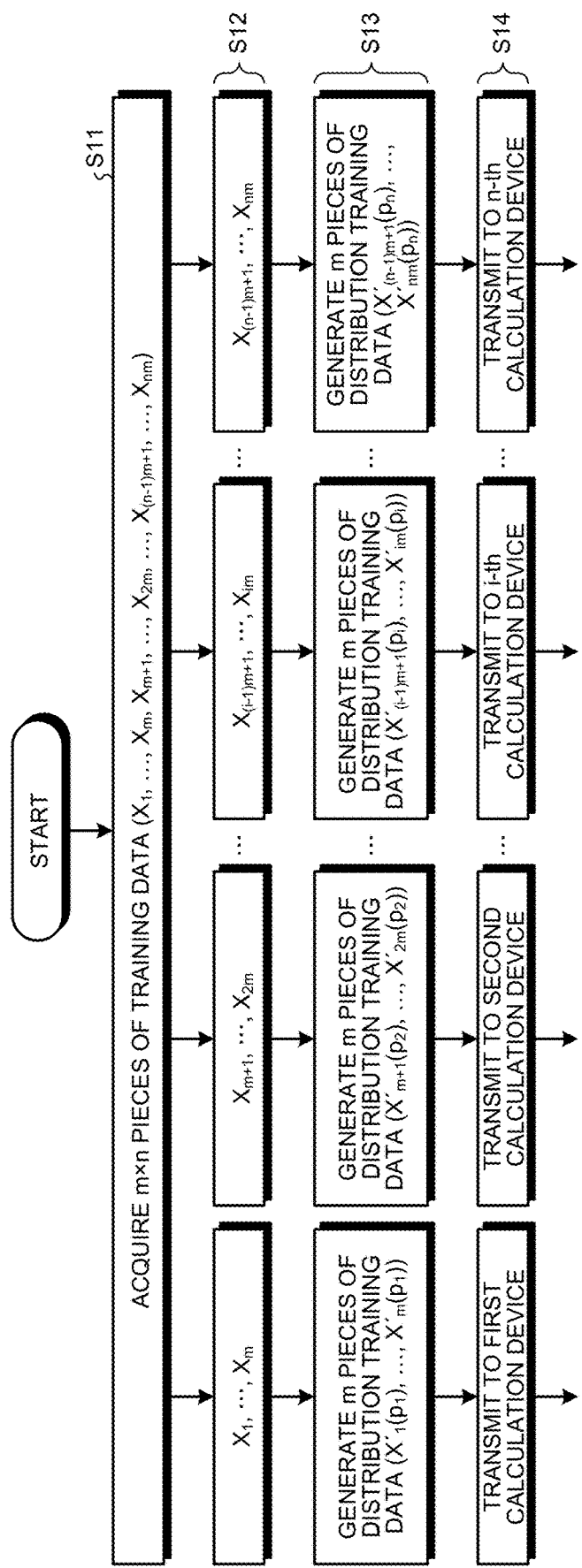
FIG. 6 is a flowchart of a first process in a training process.
Figure 7:
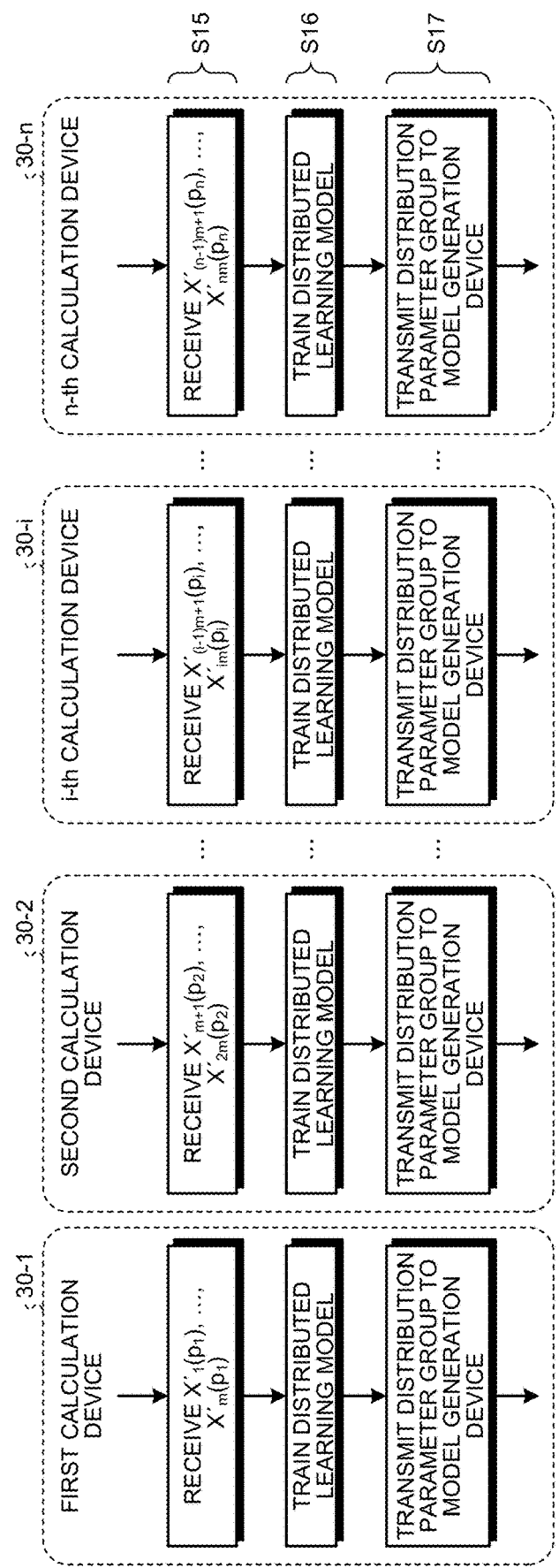
FIG. 7 is a flowchart of a second process in the training process.
Figure 8:
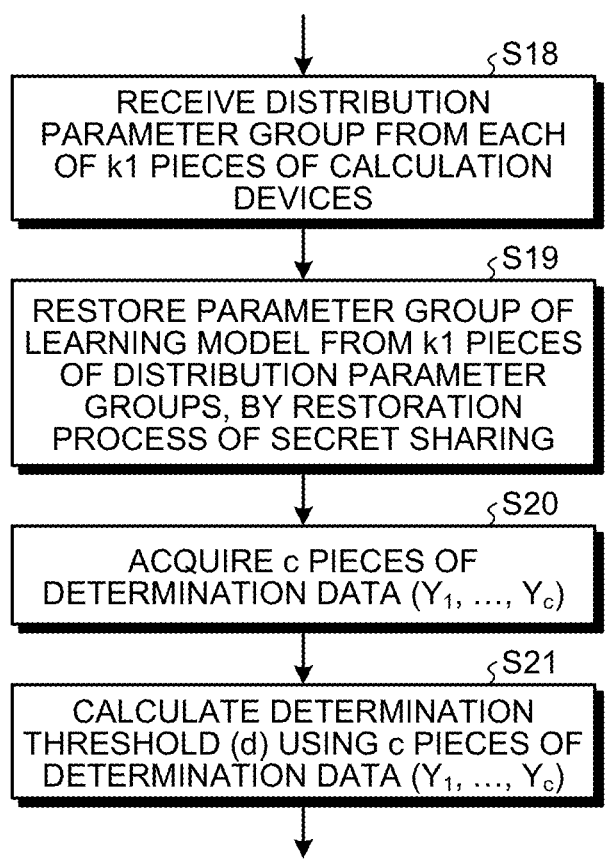
FIG. 8 is a flowchart of a third process in the training process.
Figure 9:
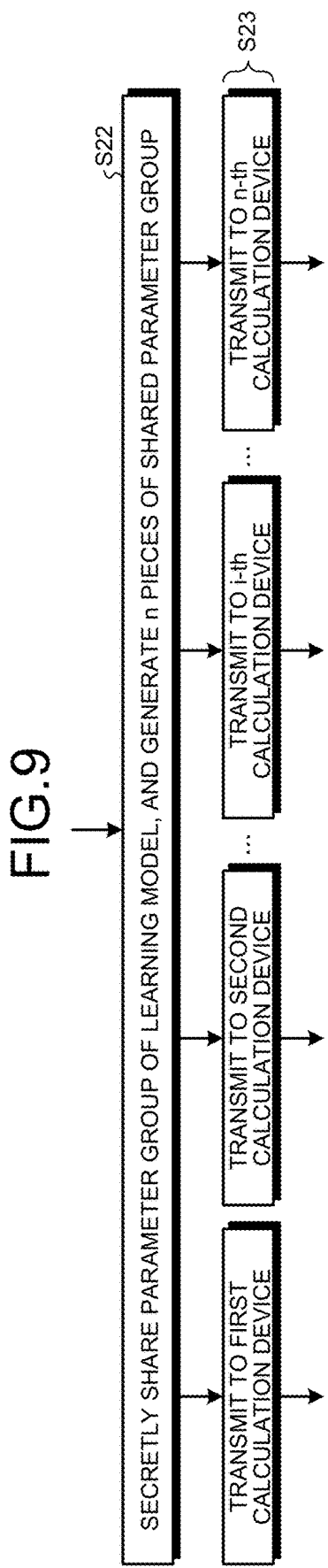
FIG. 9 is a flowchart of a fourth process in the training process.
Figure 10:
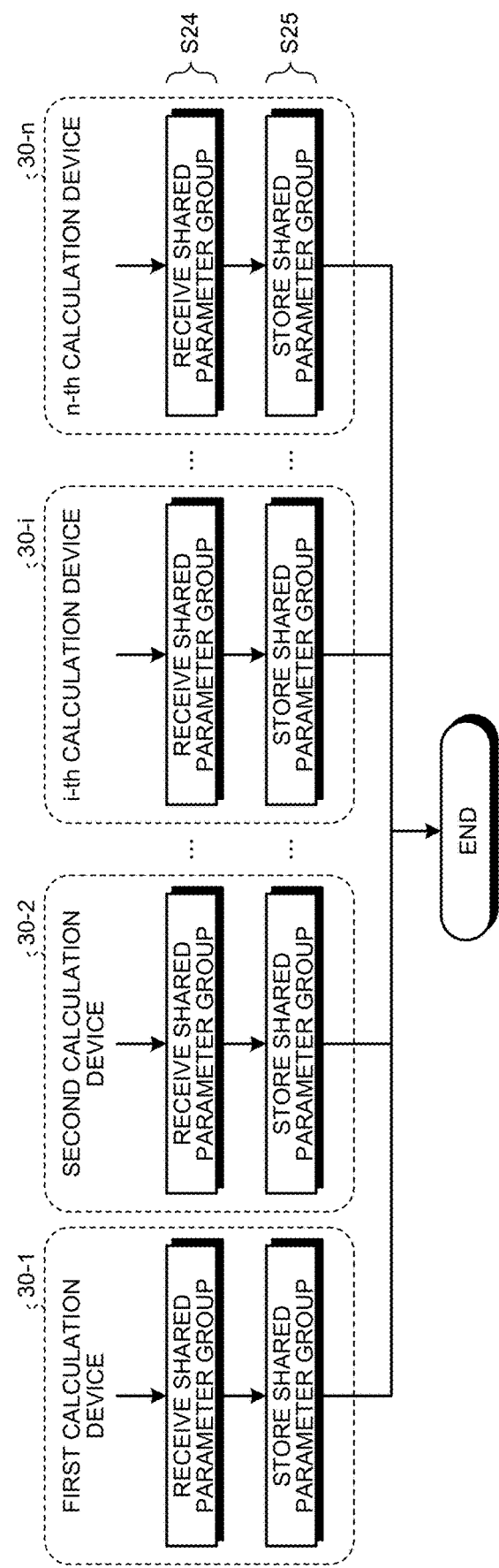
FIG. 10 is a flowchart of a fifth process in the training process.

FIG. 5 is a diagram illustrating the contents of a process in the secret sharing scheme with respect to g-th training data X$_g$.

Each of the m×n pieces of training data, each of the c pieces of determination data, and the input data have the same data configuration. For example, when the learning model is an autoencoder, and the number of nodes of the input layer and the output layer is h (h is an integer equal to or greater than two), these data are arranged so as to include 1×h pieces of sub data. For example, these data are output values of h pieces of sensors at the same time.

In this example, it is assumed that X$_g$ is g-th training data (g is any integer equal to or greater than one and equal to or less than m×n) among the m×n pieces of training data. Moreover, it is assumed that X$_g$ is arranged so as to include h pieces of sub data (x$_{g-1}$, x$_{g-2}$, . . . , x$_{g-h}$).

When the distribution process of the secret sharing scheme is to be performed on X$_g$, the model distribution device 40 generates n pieces of distribution sub data for each of the h pieces of sub data included in X$_g$, by the distribution process of the secret sharing scheme.

In other words, in this case, the model generation device 40 generates n pieces of distribution sub data (x'$_{g-1}$(P$_1$), x'$_{g-1}$(P$_2$), . . . , x'$_{g-1}$(P$_n$)) for the first sub data (x$_{g-1}$). Moreover, the model generation device 40 generates n pieces of distribution sub data (x'$_{g-2}$(P$_1$), x'$_{g-2}$(P$_2$), . . . , x'$_{g-2}$(P$_n$)) for the second sub data (x$_{g-2}$). Furthermore, the model generation device 40 generates n pieces of distribution sub data (x'$_{g-h}$(P$_1$), x'$_{g-h}$(P$_2$), . . . , x'$_{g-h}$(P$_n$)) for the h-th sub data (x$_{g-h}$).

The model generation device 40 also generates n pieces of distribution training data, when the distribution process of the secret sharing scheme is performed on one training data. For example, when the distribution process of the secret sharing scheme is performed on X$_g$, the model generation device 40 generates n pieces of distribution training data (x'$_g$(P$_1$), x'$_g$(P$_2$), . . . , x'$_g$(P$_n$)).

In this example, each of the n pieces of distribution training data is arranged so as to include the h pieces of distribution sub data generated based on the same element. For example, the distribution training data based on P$_1$ (x'$_g$(P$_1$)) among the n pieces of distribution training data is arranged so as to include h pieces of distribution sub data (x'$_{g-1}$(P$_1$), x'$_{g-2}$(P$_1$), . . . , x'$_{g-h}$(P$_1$)) based on P$_1$. Moreover, the distribution training data based on P$_2$ (x'$_g$(P$_2$)) is arranged so as to include h pieces of distribution sub data (x'$_{g-1}$(P$_2$), x'$_{g-2}$(P$_2$), . . . , x'$_{g-h}$(P$_2$)) based on P$_2$. Furthermore, the distribution training data based on P$_n$ (x'$_g$(P$_n$)) is arranged so as to include h pieces of distribution sub data (x'$_{g-1}$(P$_n$), x'$_{g-2}$(P$_n$), . . . , x'$_{g-h}$(P$_n$)) based on P$_n$.

In the training process, each of the n pieces of calculation devices 30 supplies each of the h pieces of distribution sub data included in the acquired distribution training data, to the corresponding node among the h pieces of nodes included in the input layer of the distributed learning model (for example, autoencoder).

The inference device 42 also performs the similar process on the input data. Then, in the inference process, each of the n pieces of calculation devices 30 supplies each of the h pieces of distribution sub data included in the acquired distribution input data, to the corresponding node among the h pieces of nodes included in the input layer of the distributed learning model.

FIG. 6, FIG. 7, FIG. 8, FIG. 9, and FIG. 10 are each a flowchart illustrating the flow of a training process performed by the learning system 10. In the training process, the learning system 10 performs the process flow illustrated in each of FIG. 6, FIG. 7, FIG. 8, FIG. 9, and FIG. 10.

At S11, the acquisition unit 50 acquires m×n pieces of training data used for training the learning model. In the present example, the acquisition unit 50 acquires X$_1$, . . . , X$_m$, X$_{m+1}$, . . . , X$_{2m}$, . . . , X$_{(n-1)m+1}$, . . . , X$_{nm}$, as the m×n pieces of training data. Each of X$_1$, . . . , X$_{nm}$ is plaintext. For example, X$_1$, . . . , X$_{nm}$ are data continuous in time series.

Subsequently, at S12, the splitting unit 52 splits the m×n pieces of training data into n pieces of groups each including m pieces of training data. For example, when X$_1$, . . . , X$_{nm}$ are data continuous in time series, the splitting unit 52 splits data into [X$_1$, . . . , X$_m$], [X$_{m+1}$, . . . , X$_{2m}$], . . . , [X$_{(n-1)m+1}$, . . . , X$_{nm}$] such that the m pieces of training data included in one group are continuous in time series.

Subsequently, at S13, the secret sharing unit 54 generates m pieces of distribution training data for each of the n pieces of groups, by the distribution process of the secret sharing scheme. In this case, the secret sharing unit 54 generates distribution training data for each of the m pieces of training data included in the i-th group among the n pieces of groups, using the i-th element (P$_i$) among the n pieces of elements (P$_1$, P$_2$, . . . , P$_i$, . . . , P$_n$) by the distribution process of the secret sharing scheme.

In the present example, X'$_g$ (P$_i$) is the distribution training data obtained by secretly sharing X$_g$ using the element P$_i$. The secret sharing unit 54 generates [X'$_1$(P$_1$), . . . , X'$_m$(P$_1$)] obtained by performing a distribution process on each of [X$_1$, . . . , X$_m$] included in the first group using the element P$_1$. Moreover, the secret sharing unit 54 generates [X'$_{m+1}$(P$_2$), . . . , X'$_{2m}$(P$_2$)] obtained by performing a distribution process on each of [X$_{m+1}$, . . . , X$_{2m}$] included in the second group using the element P$_2$. Furthermore, the secret sharing unit 54 generates [X'$_{(i-1)m+1}$(P$_i$), . . . , X'$_{im}$(P$_i$)] obtained by performing a distribution process on each of $[X_{(i-1)m+1}, \ldots, X_{im}]$ included in the i-th group using the element $P_i$. Still furthermore, the secret sharing unit 54 generates $[X'_{(n-1)m+1}(P_n), \ldots, X'_{nm}(P_n)]$ obtained by performing a distribution process on $[X_{(n-1)m+1}, \ldots, X_{nm}]$ included in the n-th group using the element $P_n$.

Subsequently, at S14, the share transmission unit 56 transmits the corresponding m pieces of distribution training data to each of the n pieces of calculation devices 30.

Subsequently, at S15, the share reception unit 58 of each of the n pieces of calculation devices 30 receives the m pieces of distribution training data from the model generation device 40. For example, a first calculation device 30-1 receives $[X'_1(P_1), \ldots, X'_m(P_1)]$. For example, a second calculation device 30-2 receives $[X'_{m+1}(P_2), \ldots, X'_{2m}(P_2)]$. For example, an i-th calculation device 30-i receives $[X'_{(i-1)m+1}(P_i), \ldots, X'_{im}(P_i)]$. For example, an n-th calculation device 30-n receives $[X'_{(n-1)m+1}(P_n), \ldots, X'_{nm}(P_n)]$.

Subsequently, at S16, the training unit 60 of each of the n pieces of calculation devices 30 trains the distributed learning model using the received m pieces of distribution training data. The distributed learning model has a configuration same as that of the learning model. The model generation device 40 and each of the n pieces of calculation devices 30 share the configuration of the learning model and the distributed learning model. For example, when the distributed learning model is an autoencoder, the number of nodes of the input layer and the output layer, and the number of nodes of the intermediate layer are shared. When the distributed learning model is an autoencoder, the training unit 60 of each of the n pieces of calculation devices 30 trains the distributed learning model such that when the distribution training data is supplied, the same data as that of the supplied distribution training data is output.

Subsequently, at S17, the parameter transmission unit 62 of each of the n pieces of calculation devices 30 transmits the trained distribution parameter group in the distributed learning model to the model generation device 40. For example, when the distributed learning model is an autoencoder, the parameter transmission unit 62 transmits a plurality of weights and a plurality of biases obtained as a result of training to the model generation device 40, as the trained distribution parameter group. It is to be noted that each of the n pieces of calculation devices 30 trains the distributed learning model using the m pieces of distribution training data different from one another. Consequently, each of the n pieces of calculation devices 30 transmits the distribution parameter groups different from one another to the model generation device 40.

Subsequently, at S18, the parameter reception unit 64 of the model generation device 40 receives the trained distribution parameter group from each of the k1 pieces of calculation devices 30 among the n pieces of calculation devices 30. In this example, the k1 pieces are the number of shares required for restoring the inverse function of the equation representing the learning model, by the restoration process of the secret sharing scheme. The inverse function of the equation representing the learning model is a function using the result data output from the learning model as a variable, and using the training data supplied to the learning model as a value. Moreover, in this case, the trained distribution parameter group is to be shared.

Subsequently, at S19, the parameter restoration unit 66 generates a parameter group of the learning model on the basis of the k1 pieces of distribution parameter groups received from the k1 pieces of calculation devices 30, by the restoration process of the secret sharing scheme.

More specifically, the parameter restoration unit 66 substitutes the corresponding distribution parameter group into the inverse function of a model expression represented by an equation using the result data as a variable and using the training data as a value, for each of the k1 pieces of calculation devices 30. Subsequently, the parameter restoration unit 66 restores the inverse function of the learning model using the k1 pieces of inverse functions into which the corresponding distribution parameter group is substituted, by the restoration process of the secret sharing scheme. The parameter restoration unit 66 then generates a parameter group of the learning model, on the basis of the restored inverse function of the learning model.

Subsequently, at S20, the determination data acquisition unit 68 acquires c pieces of determination data. In the present example, the determination data acquisition unit 68 acquires $[Y_1, \ldots, Y_c]$ as the c pieces of determination data.

Subsequently, at S21, the threshold calculation unit 70 calculates a determination threshold by giving the c pieces of determination data to the learning model in which the parameter group generated by the restoration process of the secret sharing scheme is set. The determination threshold indicates a boundary of the error value used for determining whether the input data and the result data are the same or not the same. The threshold calculation unit 70 calculates the determination threshold such that the determination result has the highest accuracy. In the present example, the threshold calculation unit 70 calculates a determination threshold d. The threshold calculation unit 70 supplies the determination threshold to the inference device 42.

Subsequently, at S22, the model secret sharing unit 72 generates n pieces of shared parameter groups for the restored parameter group of the learning model, by the distribution process of the secret sharing scheme. For example, the model secret sharing unit 72 generates the n pieces of shared parameter groups for each of the parameters included in the parameter group, by the distribution process of the secret sharing scheme. For example, when the learning model is an autoencoder, the model secret sharing unit 72 generates the n pieces of shared parameter groups for each of the restored weights and biases, by the distribution process of the secret sharing scheme. The n pieces of shared parameter groups correspond to the n pieces of calculation devices 30 on one-to-one basis.

Subsequently, at S23, the model transmission unit 74 transmits the corresponding shared parameter group among the n pieces of shared parameter groups, to each of the n pieces of calculation devices 30.

Subsequently, at S24, the model reception unit 76 of each of the n pieces of calculation devices 30 receives the shared parameter group from the model generation device 40. Then, at step S25, the model storage unit 78 of each of the n pieces of calculation devices 30 stores therein the received shared parameter group.

In this manner, in the training process, the learning system 10 executes the processes from S11 to S25. Consequently, the learning system 10 enables the n pieces of calculation devices 30 to train the learning model, while keeping secrecy of the training data from the n pieces of calculation devices 30.

Figure 11:
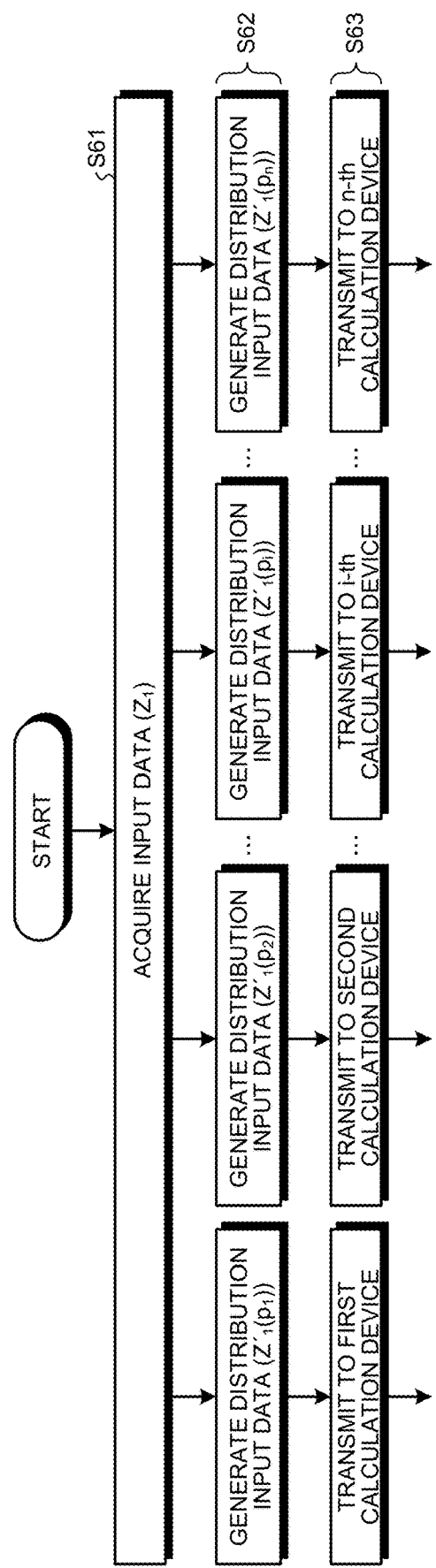
FIG. 11 is a flowchart of a first process in an inference process.
Figure 12:
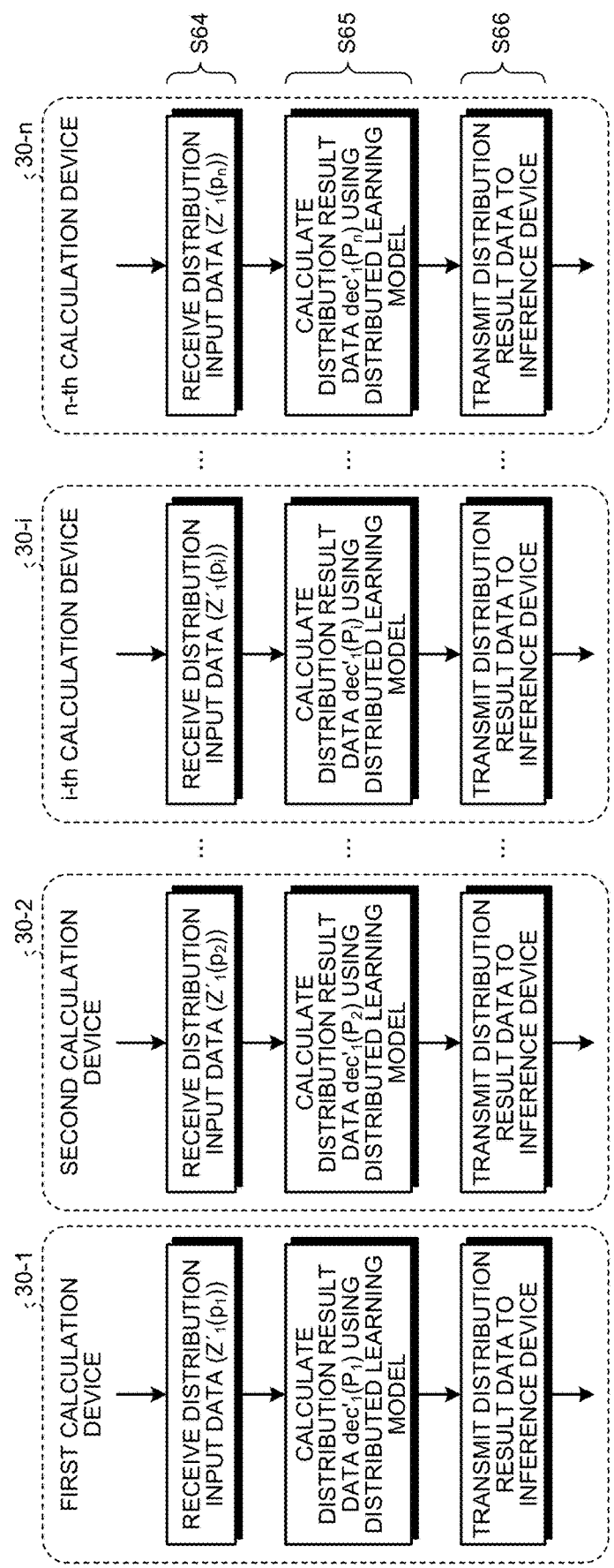
FIG. 12 is a flowchart of a second process in the inference process.
Figure 13:
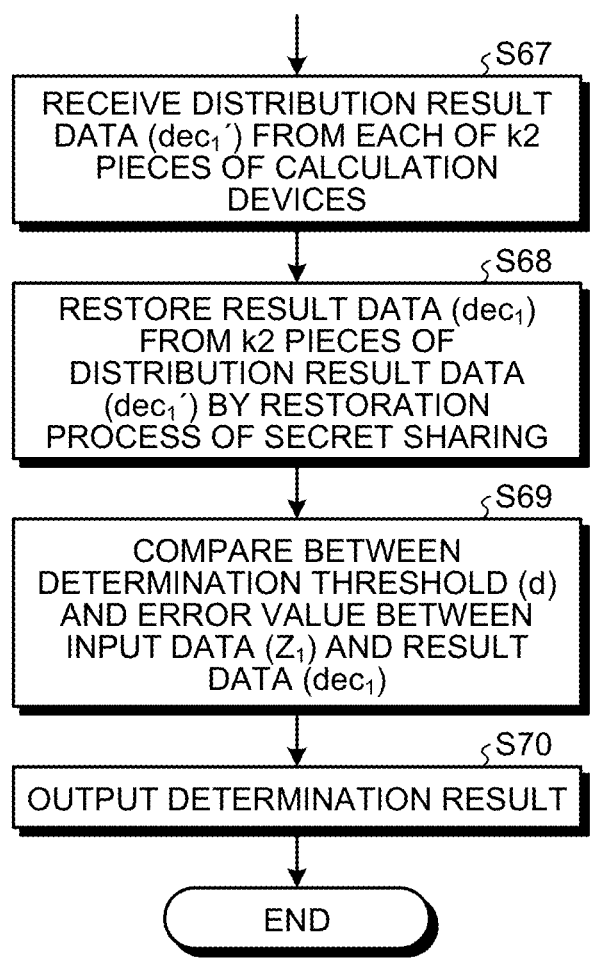
FIG. 13 is a flowchart of a third process in the inference process.

FIG. 11, FIG. 12, and FIG. 13 are each a flowchart illustrating the flow of the inference process performed by the learning system 10. In the inference process, the learning system 10 performs the process flow illustrated in each of FIG. 11, FIG. 12, and FIG. 13.

First, at S61, the input data acquisition unit 80 of the inference device 42 acquires input data used to enable the learning model to make inference. In the present example, the input data acquisition unit 80 acquires input data $Z_1$. The input data acquisition unit 80 may also acquire a plurality of pieces of input data $(Z_1, \ldots, Z_s)$ (s is an integer equal to or greater than two) arranged in time series. In this case, the inference device 42 and each of the n pieces of calculation devices 30 execute the same process as that performed on $Z_1$, on each of the pieces of input data $(Z_1, \ldots, Z_s)$.

Subsequently, at S62, the input data secret sharing unit 82 generates n pieces of distribution input data for the acquired input data, by the distribution process of the secret sharing scheme. In the present example, $Z_1'(P_i)$ is the distribution training data obtained by secretly sharing $Z_1$ using the element $P_i$. Thus, the input data secret sharing unit 82 generates $Z'_1(P_1), Z'_1(P_2), \ldots, Z'_i(P_i), \ldots, Z'_1(P_n)$. The n pieces of distribution input data correspond to the n pieces of calculation devices 30 on one-to-one basis.

Subsequently, at S63, the distribution input data transmission unit 84 transmits the corresponding distribution input data among the n pieces of distribution input data to each of the n pieces of calculation devices 30.

Subsequently, at S64, the distribution input data reception unit 86 of each of the n pieces of calculation devices 30 receives the distribution input data from the inference device 42. For example, the first calculation device 30-1 receives $Z'_1(P_1)$. For example, the second calculation device 30-2 receives $Z'_1(P_2)$. For example, the i-th calculation device 30-$i$ receives $Z'_1(P_i)$. For example, the n-th calculation device 30-$n$ receives $Z'_i(P_n)$.

Subsequently, at S65, the inference unit 88 of each of the n pieces of calculation devices 30 acquires the shared parameter group from the model storage unit 78. Then, on the basis of the distributed learning model in which the shared parameter group is set and the received distribution input data, the inference unit 88 generates distribution result data. The distribution result data generated by the inference unit 88 of each of the n pieces of calculation devices 30 is the corresponding distribution result data among the n pieces of distribution result data that are obtained by distributing the result data obtained by giving the input data to the learning model, by the distribution process of the secret sharing scheme. For example, when the distributed learning model is an autoencoder, the inference unit 88 supplies each of the h pieces of distribution sub data included in the acquired distribution input data, to the corresponding node among the h pieces of nodes included in the input layer.

In the present example, the inference unit 88 of the first calculation device 30-1 generates $\text{dec}'_1(P_1)$. The inference unit 88 of the second calculation device 30-2 generates $\text{dec}'_1(P_2)$. The inference unit 88 of the i-th calculation device 30-$i$ generates $\text{dec}'_1(P_i)$. For example, the inference unit 88 of the n-th calculation device 30-$n$ generates $\text{dec}'_1(P_n)$.

In this example, for example, the inference unit 88 of each of the n pieces of calculation devices 30 executes the inference process using the processing method described in a conventional technique.

The conventional technique enables a server to perform an inference process using a neural network on the distribution data calculated by Shamir's threshold secret sharing scheme, using multi-party computation (MPC). The multi-party computation allows the distribution data to be added, multiplied, ORed, and ANDed. The multi-party computation is a technique that enables computation on secret information, by allowing servers to communicate with each other without revealing the secret information to the other party. For example, when the Shamir's threshold secret sharing scheme is used, the server can add distribution data (shared), add distribution data (shared) and plaintext, and multiply distribution data (shared) by plaintext, without communicating with another server. However, to multiply distribution data (shared), the server communicates with another server.

Subsequently, at S66, the result transmission unit 90 of each of the n pieces of calculation devices 30 transmits the generated distribution result data to the inference device 42.

Subsequently, at S67, the result reception unit 92 of the inference device 42 receives the distribution result data from each of the k2 pieces of calculation devices 30 among the n pieces of calculation devices 30. The k2 pieces are the number of shares required for restoring the result data by the restoration process of the secret sharing scheme. In this case, the distribution result data inferred from the distribution input data by the calculation device 30 is to be shared.

Subsequently, at S68, the result restoration unit 94 generates result data on the basis of the k2 pieces of distribution result data received from the k2 pieces of calculation devices 30, by the restoration process of the secret sharing scheme. In the present example, the result restoration unit 94 restores result data $\text{dec}_1$ from the k2 pieces of distribution result data $\text{dec}'_1$. When a plurality of input data $(Z_1, \ldots, Z_s)$ are acquired, the result restoration unit 94 restores a plurality of pieces of result data $(\text{dec}_1, \ldots, \text{dec}_s)$ corresponding to the pieces of input data.

Subsequently, at S69, the determination unit 98 calculates the error value between the input data $(Z_1)$ and the result data (decd. Moreover, the determination unit 98 compares between the calculated error value and the determination threshold (d) stored in the threshold storage unit 96.

Subsequently, at S70, when the error value is smaller than the determination threshold (d), the determination unit 98 outputs a determination result indicating that the input data and the restored result data are the same. Moreover, when the error value is equal to or greater than the determination threshold (d), the determination unit 98 outputs a determination result indicating that the input data and the restored result data are not the same. When the pieces of input data $(Z_1, \ldots, Z_s)$ are acquired, the determination unit 98 may output a determination result of each of the pieces of input data, or may output information indicating that some kind of abnormality has occurred on the system that has acquired the pieces of input data, on the basis of the determination result of each of the pieces of input data. The determination unit 98 then outputs the determination result.

In this manner, in the inference process, the learning system 10 executes the processes from S61 to S70. Consequently, the learning system 10 enables the n pieces of calculation devices 30 to perform the inference process, while keeping secrecy of the input data from the n pieces of calculation devices 30.

As described above, the learning system 10 according to the present embodiment enables the n pieces of calculation devices 30 to calculate for the learning process and to calculate for the inference process, while keeping secrecy of the training data, the parameter group of the learning model, and the input data from the n pieces of calculation devices 30. Moreover, in the learning process, the learning system 10 according to the present embodiment enables the n pieces of calculation devices 30 to train the distributed learning model, by transmitting the m pieces of distribution training data that are kept secret from each of the n pieces of calculation devices 30 using the corresponding element. Thus, the learning system 10 according to the present embodiment can reduce the data amount supplied to each of the n pieces of calculation devices 30, and reduce the computation amount of each of the n pieces of calculation devices 30 during training.

Second Embodiment

Next, the learning system 10 according to a second embodiment will be described. The learning system 10 according to the second embodiment has substantially the same function and configuration as those of the first embodiment. In the second embodiment, components having the same function and configuration as those of the first embodiment are designated by the same reference numerals and the detailed description thereof is omitted except for differences.

Figure 14:
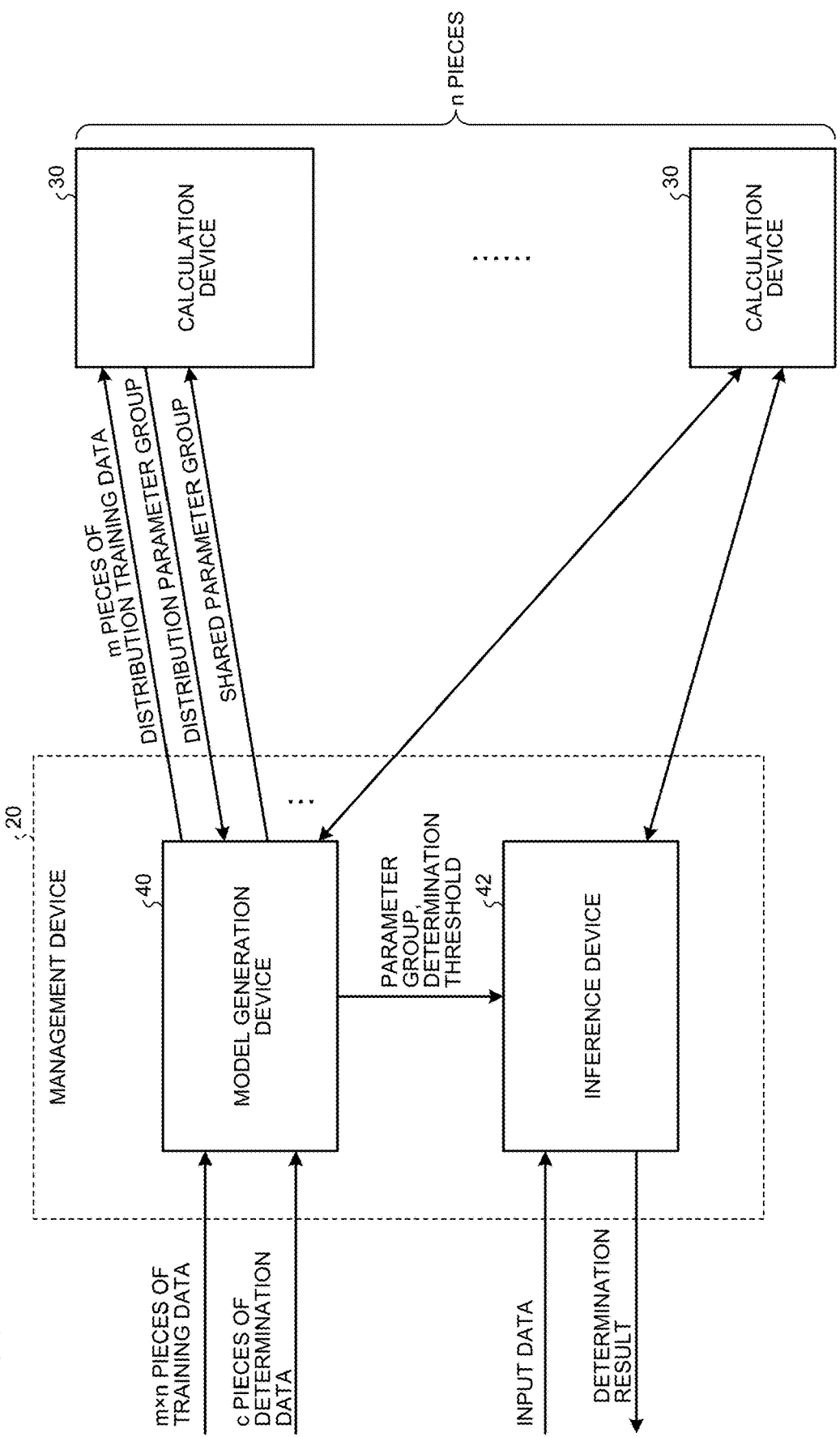
FIG. 14 is a diagram illustrating a configuration of a learning system according to a second embodiment.

FIG. 14 is a diagram illustrating a configuration of the learning system 10 according to the second embodiment. The learning system 10 according to the second embodiment trains a learning model while keeping secrecy of training data and a parameter group of the learning model.

The model generation device 40 according to the second embodiment restores the parameter group of the learning model, and supplies the restored parameter group to the inference device 42 with the determination threshold. The model generation device 40 according to the second embodiment does not generate the n pieces of shared parameter groups from the restored parameter group, and does not transmit the shared parameter group to the n pieces of calculation devices 30.

In the inference process, the inference device 42 according to the second embodiment calculates the result data from the input data, using the learning model in which the restored parameter group is set. The inference device 42 according to the second embodiment then generates a determination result indicating the evaluation result of the input data, on the basis of the input data, the result data, and the determination threshold. The inference device 42 then outputs the determination result. Each of the n pieces of calculation devices 30 according to the second embodiment does not perform processing during inference.

Figure 15:
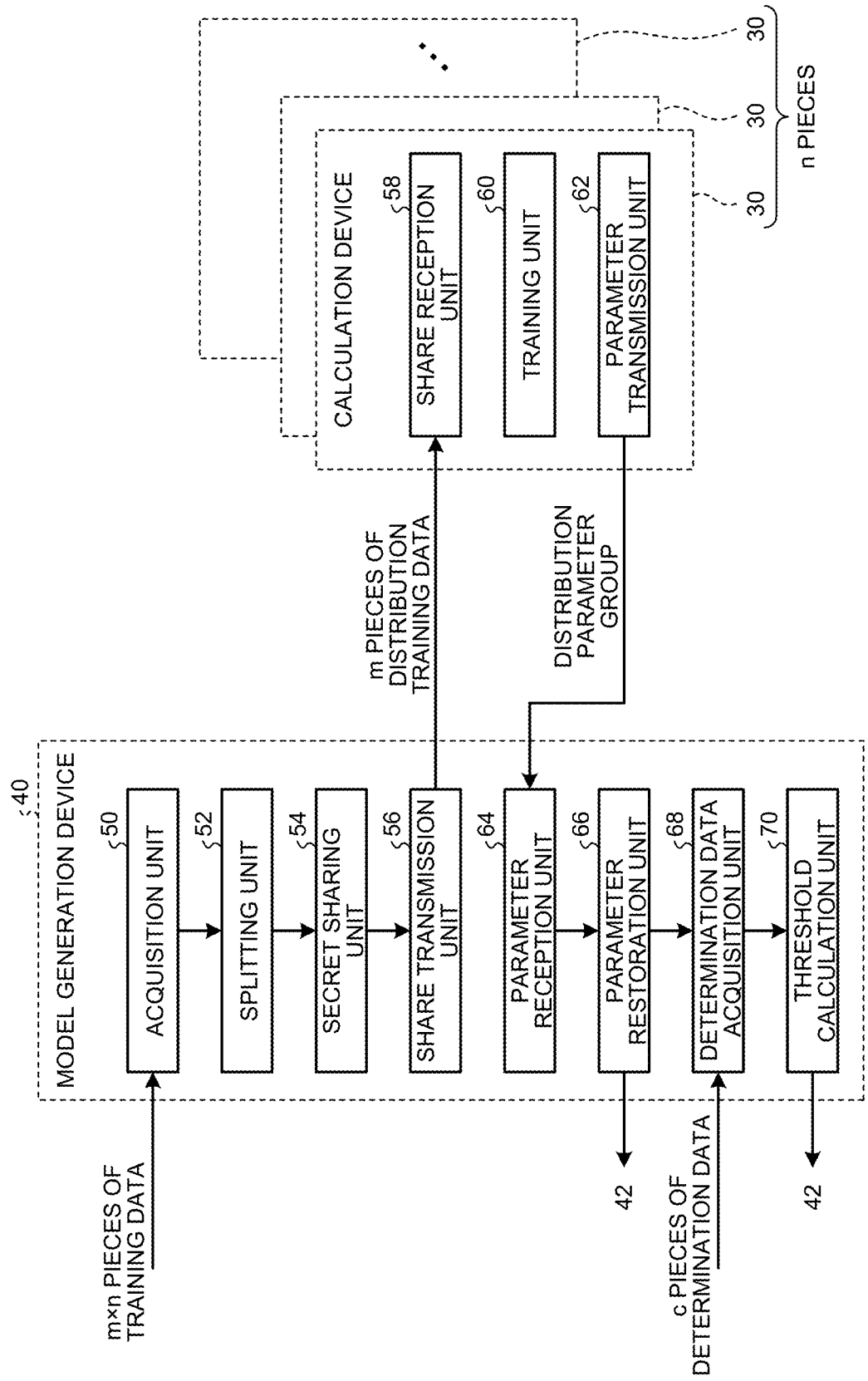
FIG. 15 is a configuration diagram of a model generation device and a learning device according to the second embodiment during learning.

FIG. 15 is a diagram illustrating the functional configuration of the model generation device 40 and the calculation device 30 according to the second embodiment during learning.

The model generation device 40 according to the second embodiment includes the acquisition unit 50, the splitting unit 52, the secret sharing unit 54, the share transmission unit 56, the parameter reception unit 64, the parameter restoration unit 66, the determination data acquisition unit 68, and the threshold calculation unit 70. In other words, compared with that in the first embodiment, the model generation device 40 according to the second embodiment does not include the model secret sharing unit 72 and the model transmission unit 74. Each of the n pieces of calculation devices 30 according to the second embodiment includes the share reception unit 58, the training unit 60, and the parameter transmission unit 62. In other words, compared with that in the first embodiment, each of the n pieces of calculation devices 30 according to the second embodiment does not include the model reception unit 76 and the model storage unit 78.

In the second embodiment, the parameter restoration unit 66 supplies the restored parameter group of the learning model to the inference device 42.

Figure 16:
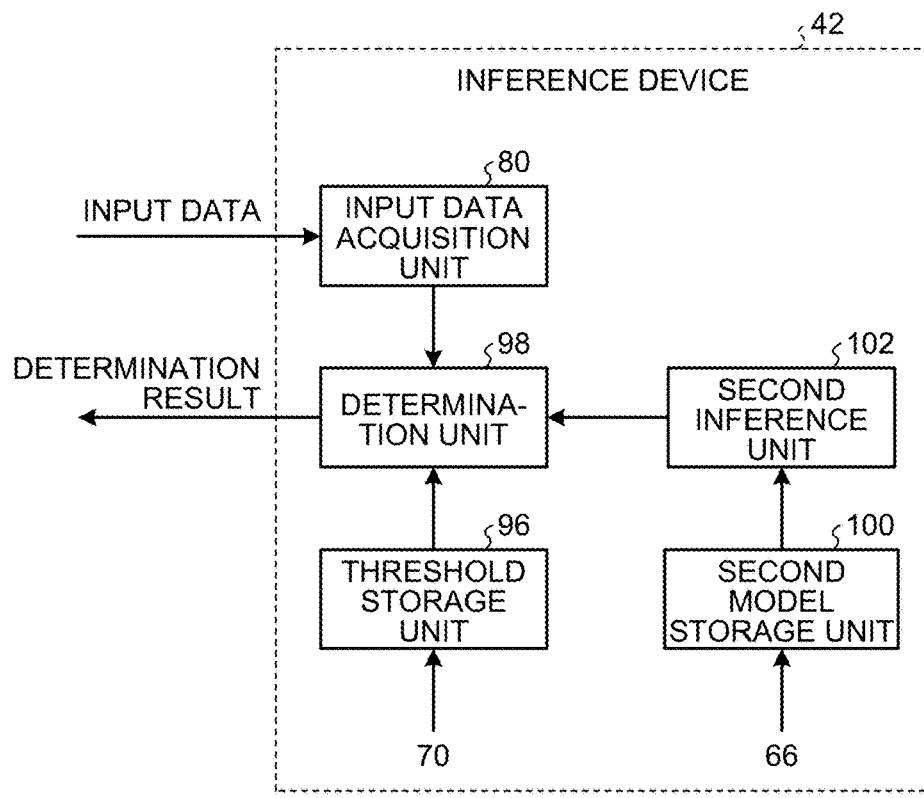
FIG. 16 is a configuration diagram of an inference device according to the second embodiment.

FIG. 16 is a diagram illustrating the functional configuration of the inference device 42 according to the second embodiment.

The inference device 42 according to the second embodiment includes the input data acquisition unit 80, a second model storage unit 100, a second inference unit 102, the threshold storage unit 96, and the determination unit 98. In other words, compared with that in the first embodiment, the inference device 42 according to the second embodiment does not include the input data secret sharing unit 82, the distribution input data transmission unit 84, the result reception unit 92, and the result restoration unit 94, but further includes the second model storage unit 100 and the second inference unit 102.

The second model storage unit 100 stores therein a parameter group of the learning model restored by the parameter restoration unit 66 of the model generation device 40. The second inference unit 102 acquires the parameter group from the second model storage unit 100. The second inference unit 102 generates result data on the basis of the learning model in which the parameter group is set, and the acquired input data. The determination unit 98 generates the determination result indicating the evaluation result of the input data, on the basis of the input data, the result data generated by the second inference unit 102, and the determination threshold.

Figure 17:
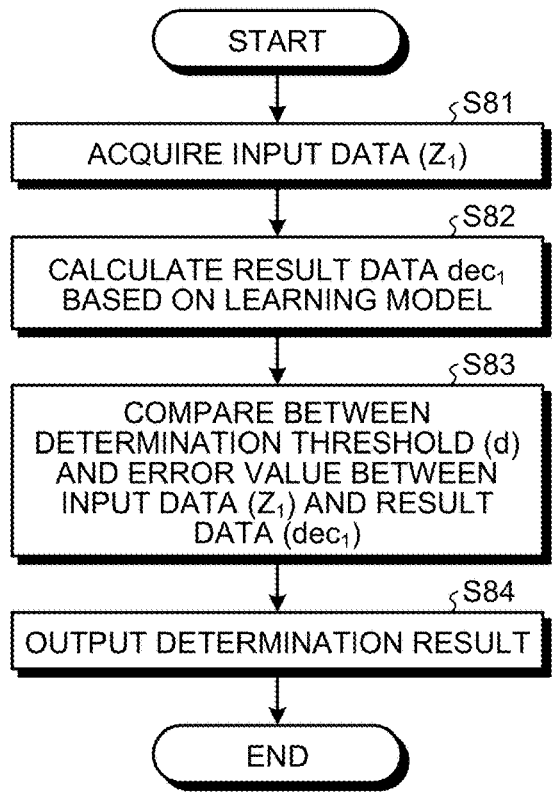
FIG. 17 is a flowchart of an inference process according to the second embodiment.

FIG. 17 is a flowchart illustrating the flow of the inference process performed by the learning system 10 according to the second embodiment. In the learning process, the learning system 10 according to the second embodiment performs the processes from S11 to S21 illustrated in FIG. 6 to FIG. 8 described in the first embodiment. In the inference process, the learning system 10 according to the second embodiment performs the process flow illustrated in FIG. 17.

First, at S81, the input data acquisition unit 80 acquires input data ($Z_1$) used to enable the learning model to make inference.

Subsequently, at S82, the second inference unit 102 acquires a parameter group from the second model storage unit 100. The second inference unit 102 then generates result data ($dec_1$), on the basis of the learning model in which the parameter group is set and the acquired input data. For example, when the learning model is an autoencoder, the second inference unit 102 supplies each of the h pieces of distribution sub data included in the acquired input data, to the corresponding node among the h pieces of nodes included in the input layer.

Subsequently, at S83, the determination unit 98 calculates the error value between the input data ($Z_1$) and the result data ($dec_1$). Moreover, the determination unit 98 compares between the calculated error value and the determination threshold (d) stored in the threshold storage unit 96.

Subsequently, at S84, when the error value is smaller than the determination threshold (d), the determination unit 98 outputs a determination result indicating that the input data and the restored result data are the same. Moreover, when the error value is equal to or greater than the determination threshold (d), the determination unit 98 outputs a determination result indicating that the input data and the restored result data are not the same. When the pieces of input data ($Z_1, \ldots, Z_s$) are acquired, the determination unit 98 may output a determination result for each of the pieces of input data, or may output information indicating that some kind of abnormality has occurred on the system that has acquired the pieces of input data, on the basis of the determination result for each of the pieces of input data. The determination unit 98 then outputs the determination result.

As described above, the learning system 10 according to the present embodiment enables the n pieces of calculation devices 30 to calculate for the learning process and to calculate for the inference process, while keeping secrecy of the training data, the parameter group of the learning model, and the input data from the n pieces of calculation devices 30. Consequently, the learning system 10 according to the present embodiment can reduce the data amount supplied to each of the n pieces of calculation devices 30, and reduce the computation amount of each of the n pieces of calculation devices 30 during training.

Hardware Configuration

Figure 18:
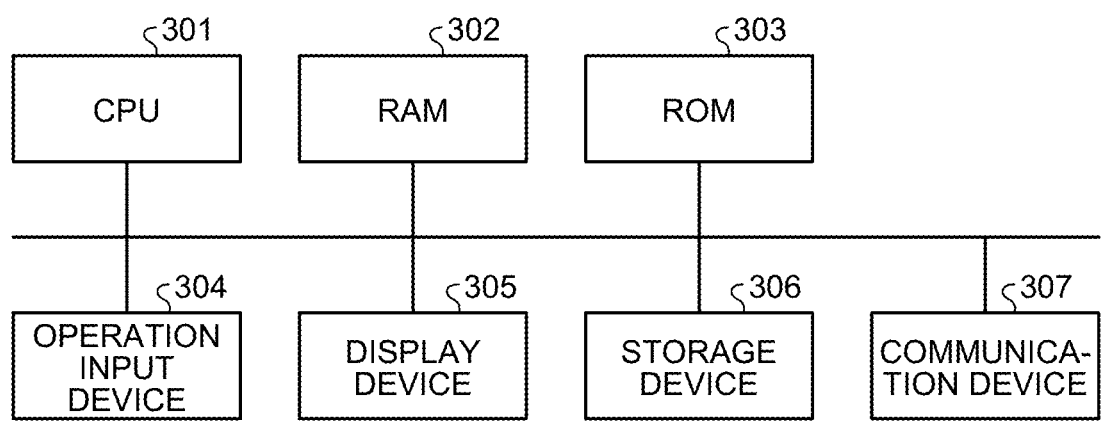
FIG. 18 is a diagram illustrating an example of a hardware configuration of an information processing device.

FIG. 18 is a diagram illustrating an example of a hardware configuration of the calculation device 30, the model generation device 40, and the inference device 42. For example, the calculation device 30 is implemented by an information processing device having a hardware configuration as illustrated in FIG. 18. The model generation device 40 and the inference device 42 are also implemented by the similar hardware configuration. The information processing device includes a central processing unit (CPU) 301, a random access memory (RAM) 302, a read only memory (ROM) 303, an operation input device 304, a display device 305, a storage device 306, and a communication device 307. These units are connected via a bus. Alternatively, the information processing device may not include the operation input device 304 and the display device 305.

The CPU 301 is a processor that executes arithmetic processing, control processing, and the like according to computer programs. The CPU 301 executes various processes in cooperation with the computer programs stored in the ROM 303, the storage device 306, and the like, using a predetermined area in the RAM 302 as a working area.

The RAM 302 is a memory such as a synchronous dynamic random access memory (SDRAM). The RAM 302 functions as a working area of the CPU 301. The ROM 303 is a memory that stores therein computer programs and various types of information in a non-rewritable manner.

The operation input device 304 is an input device such as a mouse and a keyboard. The operation input device 304 receives information operated and input by the user as an instruction signal, and outputs the instruction signal to the CPU 301.

The display device 305 is a display device such as a liquid crystal display (LCD). The display device 305 displays various types of information on the basis of a display signal from the CPU 301.

The storage device 306 is a device that writes and reads data to and from a semiconductor storage medium such as a flash memory, a magnetically or an optically recordable storage device, or the like. The storage device 306 writes and reads data to and from the storage medium according to the control from the CPU 301. The communication device 307 communicates with an external device according to the control from the CPU 301, via a network.

A computer program product having a non-transitory computer readable medium including instructions that cause the information processing device to function as the model generation device 40 includes an acquisition module, a splitting module, a secret sharing module, a share transmission module, a parameter reception module, a parameter restoration module, a determination data acquisition module, a threshold calculation module, a model secret sharing module, and a model transmission module. When the computer program is developed and executed on the RAM 302 by the CPU 301 (processor), the information processing device functions as the acquisition unit 50, the splitting unit 52, the secret sharing unit 54, the share transmission unit 56, the parameter reception unit 64, the parameter restoration unit 66, the determination data acquisition unit 68, the threshold calculation unit 70, the model secret sharing unit 72, and the model transmission unit 74. A part or all of the units may also be implemented by a hardware circuit.

A computer program product having a non-transitory computer readable medium including instructions that cause the information processing device to function as the inference device 42 includes an input data acquisition module, an input data secret sharing module, a distribution input data transmission module, a result reception module, a result restoration module, and a determination module. When the computer program is developed and executed on the RAM 302 by the CPU 301 (processor), the information processing device functions as the input data acquisition unit 80, the input data secret sharing unit 82, the distribution input data transmission unit 84, the result reception unit 92, the result restoration unit 94, and the determination unit 98. A part or all of the units may also be implemented by a hardware circuit. Moreover, the computer program causes the storage device 306 to function as the threshold storage unit 96.

A computer program product having a non-transitory computer readable medium including instructions that cause the information processing device to function as the calculation device 30 includes a share reception module, a training module, a parameter transmission module, a model reception module, a distribution input data reception module, an inference module, and a result transmission module. When the computer program is developed and executed on the RAM 302 by the CPU 301 (processor), the information processing device functions as the share reception unit 58, the training unit 60, the parameter transmission unit 62, the model reception unit 76, the distribution input data reception unit 86, the inference unit 88, and the result transmission unit 90. A part or all of the units may also be implemented by a hardware circuit. The computer program also causes the storage device 306 to function as the model storage unit 78.

The computer program executed by the information processing device is provided by being recorded in a computer-readable recording medium such as a compact disc-read only memory (CD-ROM), a flexible disk, a compact disc-recordable (CD-R), and a digital versatile disc (DVD) in a computer installable or computer-executable file format.

The computer program executed by the information processing device may also be provided by being stored on a computer connected to a network such as the Internet, and by causing the user to download the computer program via the network. Moreover, the computer program executed by the information processing device may be provided or distributed via the network such as the Internet. Furthermore, the computer program executed by the information processing device may be built in the ROM 303 and the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning system that trains a learning model, the learning system comprising:
a model generation device; and
n pieces of calculation devices connected to the model generation device via a network, n being an integer equal to or greater than three, wherein
the model generation device comprises:
a first hardware processor configured to function as:
an acquisition unit that acquires m×n pieces of training data used for training the learning model, m being an integer equal to or greater than two,
a splitting unit that splits the m×n pieces of training data into n groups each including m pieces of training data, the n groups corresponding to the respective n pieces of calculation devices on one-to-one basis,
a secret sharing unit that generates m pieces of distribution training data for each of the n groups by a distribution process of a secret sharing scheme, and that generates distribution training data for each of the m pieces of training data included in an i-th group, i being an integer equal to or greater than one and equal to or less than n, among the n groups using an i-th element Pi among n pieces of elements P1, P2, . . . , Pi, . . . , Pn, by the distribution process of the secret sharing scheme, and
a share transmission unit that transmits the corresponding m pieces of distribution training data to each of the n pieces of calculation devices, each of the n pieces of calculation devices comprises:
a second hardware processor configured to function as:
a share reception unit that receives the m pieces of distribution training data from the model generation device,
a training unit that trains a distributed learning model having a same configuration as a configuration of the learning model, by the received m pieces of distribution training data, and
a parameter transmission unit that transmits a trained distribution parameter group in the distributed learning model to the model generation device,
the first hardware processor of the model generation device further functions as:
a parameter reception unit that receives the trained distribution parameter group from each of k1 pieces of calculation devices, k1 being a predetermined integer equal to or greater than two and equal to or less than n−1, among the n pieces of calculation devices, and
a parameter restoration unit that generates a parameter group of the learning model, based on the distribution parameter group received from each of the k1 pieces of calculation devices, by a restoration process of the secret sharing scheme, and
the parameter restoration unit:
substitutes the corresponding distribution parameter group into an inverse function of a model expression represented by an equation using result data as a variable and using training data as a value, for each of the k1 pieces of calculation devices,
restores an inverse function of the learning model using k1 pieces of the inverse functions into which the corresponding distribution parameter group is substituted, by the restoration process of the secret sharing scheme, and generates the parameter group of the learning model based on the restored inverse function of the learning model.

2. The learning system according to claim 1, wherein the learning model is a model trained such that input data and output data are same.

3. The learning system according to claim 2, wherein the first hardware processor of the model generation device further functions as:
a determination data acquisition unit that acquires c pieces of determination data, c being an integer equal to or greater than two, the c pieces of determination data being used to evaluate an error value between data input to the learning model and data output from the learning model, and
a threshold calculation unit that calculates a determination threshold indicating a boundary of the error value used for determining whether the input data and result data are same or not same, by inputting the c pieces of determination data to the learning model in which the parameter group generated by the restoration process of the secret sharing scheme is set.

4. The learning system according to claim 3, wherein the learning model is a neural network with a three-layer configuration in which a number of nodes included in an input layer and a number of nodes included in an output layer are same, and a number of nodes included in a hidden layer is smaller than the number of nodes included in the input layer and the output layer.

5. The learning system according to claim 4, wherein
the number of nodes of the input layer and the output layer is h, h being an integer equal to or greater than three,
each of the m×n pieces of training data, or each of the input data and the result data includes h pieces of sub data,
the distribution training data includes h pieces of distribution sub data,
the secret sharing unit of the model generation device generates distribution sub data for each of the m pieces of training data included in the i-th group, using the i-th element Pi for each of the h pieces of sub data, by the distribution process of the secret sharing scheme, and
the training unit of each of the n pieces of calculation devices supplies a corresponding one piece of distribution sub data among the h pieces of distribution sub data, to each of the h pieces of nodes included in the input layer of the distributed learning model.

6. The learning system according to claim 1, wherein the secret sharing scheme is Shamir's threshold secret sharing scheme.

7. A learning system that trains a learning model, the learning system comprising:
a model generation device;
n pieces of calculation devices connected to the model generation device via a network, n being an integer equal to or greater than three; and
an inference device, wherein
the model generation device comprises:
a first hardware processor configured to function as:
an acquisition unit that acquires m×n pieces of training data used for training the learning model, m being an integer equal to or greater than two,
a splitting unit that splits the m×n pieces of training data into n groups each including m pieces of training data, the n groups corresponding to the respective n pieces of calculation devices on one-to-one basis, a secret sharing unit that generates m pieces of distribution training data for each of the n groups by a distribution process of a secret sharing scheme, and that generates distribution training data for each of the m pieces of training data included in an i-th group, i being an integer equal to or greater than one and equal to or less than n, among the n groups using an i-th element Pi among n pieces of elements P1, P2, . . . , Pi, . . . , Pn, by the distribution process of the secret sharing scheme, and a share transmission unit that transmits the corresponding m pieces of distribution training data to each of the n pieces of calculation devices, each of the n pieces of calculation devices comprises:
a second hardware processor configured to function as:
a share reception unit that receives the m pieces of distribution training data from the model generation device, a training unit that trains a distributed learning model having a same configuration as a configuration of the learning model, by the received m pieces of distribution training data, and a parameter transmission unit that transmits a trained distribution parameter group in the distributed learning model to the model generation device, the first hardware processor of the model generation device further functions as:

a parameter reception unit that receives the trained distribution parameter group from each of k1 pieces of calculation devices, k1 being a predetermined integer equal to or greater than two and equal to or less than n−1, among the n pieces of calculation devices, a parameter restoration unit that generates a parameter group of the learning model, based on the distribution parameter group received from each of the k1 pieces of calculation devices, by a restoration process of the secret sharing scheme, a model secret sharing unit that generates n pieces of shared parameter groups for the restored parameter group of the learning model, by the distribution process of the secret sharing scheme, and a model transmission unit that transmits a corresponding shared parameter group among the n pieces of shared parameter groups to each of the n pieces of calculation devices, the second hardware processor of each of the n pieces of calculation devices further functions as a model reception unit that receives the shared parameter group from the model generation device, the inference device comprises:
a third hardware processor configured to function as:
an input data secret sharing unit that generates n pieces of distribution input data for input data used to enable the learning model to make inference, in an inference process, by the distribution process of the secret sharing scheme, and a distribution input data transmission unit that transmits a corresponding piece of distribution input data among the n pieces of distribution input data to each of the n pieces of calculation devices, the second hardware processor of each of the n pieces of calculation devices further functions as:

an inference unit that generates a corresponding piece of distribution result data among n pieces of distribution result data that are obtained by distributing the result data obtained by giving the input data to the learning model, by the distribution process of the secret sharing scheme, based on the distributed learning model in which the received shared parameter group is set and the received distribution input data, and a result transmission unit that transmits the distribution result data to the inference device, and the third hardware processor of the inference device further functions as a result restoration unit that generates the result data, based on the distribution result data received from each of k2 pieces of calculation devices among the n pieces of calculation devices, by the restoration process of the secret sharing scheme, k2 being a predetermined integer equal to or greater than two and equal to or less than n−1.

8. The learning system according to claim 7, wherein the inference device further comprises a third hardware processor configured to function as a second inference unit for generating result data obtained by giving input data to the learning model, based on the learning model in which the restored parameter group of the learning model is set, and the input data used to enable the learning model to make inference.

9. A learning method that is implemented by a computer and that trains a learning model by a model generation device, n pieces of calculation devices connected to the model generation device via a network, and an inference device, n being an integer equal to or greater than three, the learning method comprising:

by the model generation device, acquiring m×n pieces of training data used for training the learning model, m being an integer equal to or greater than two;

by the model generation device, splitting the m×n pieces of training data into n groups each including m pieces of training data, the n groups corresponding to the respective n pieces of calculation devices on one-to-one basis;

by the model generation device, generating m pieces of distribution training data for each of the n groups by a distribution process of a secret sharing scheme, and generating distribution training data for each of the m pieces of training data included in an i-th group, i being an integer equal to or greater than one and equal to or less than n, among the n groups, using an i-th element Pi among n pieces of elements P1, P2, . . . , Pi, . . . , Pn, by the distribution process of the secret sharing scheme;

by the model generation device, transmitting the corresponding m pieces of distribution training data to each of the n pieces of calculation devices;

by each of the n pieces of calculation devices, receiving the m pieces of distribution training data from the model generation device;

by each of the n pieces of calculation devices, training a distributed learning model having a same configuration as a configuration of the learning model, by the received m pieces of distribution training data;

by each of the n pieces of calculation devices, transmitting a trained distribution parameter in the distributed learning model to the model generation device;

by the model generation device, receiving the trained distribution parameter group from each of k1 pieces of calculation devices, k1 being a predetermined integer equal to or greater than two and equal to or less than n−1, among the n pieces of calculation devices; and by the model generation device, generating a parameter group of the learning model, based on the distribution parameter group received from each of the k1 pieces of calculation devices, by a restoration process of the secret sharing scheme;

by the model generation device, generating n pieces of shared parameter groups for the restored parameter group of the learning model, by the distribution process of the secret sharing scheme;

by the model generation device, transmitting a corresponding shared parameter group among the n pieces of shared parameter groups to each of the n pieces of calculation devices;

by each of the n pieces of calculation devices, receiving the shared parameter group from the model generation device;

by the inference device, generating n pieces of distribution input data for input data used to enable the learning model to make inference, in an inference process, by the distribution process of the secret sharing scheme;

by the inference device, transmitting a corresponding piece of distribution input data among the n pieces of distribution input data to each of the n pieces of calculation devices;

by each of the n pieces of calculation devices, generating a corresponding piece of distribution result data among n pieces of distribution result data that are obtained by distributing the result data obtained by giving the input data to the learning model, by the distribution process of the secret sharing scheme, based on the distributed learning model in which the received shared parameter group is set and the received distribution input data;

by each of the n pieces of calculation devices, transmitting the distribution result data to the inference device; and by the inference device, generating the result data, based on the distribution result data received from each of k2 pieces of calculation devices among the n pieces of calculation devices, by the restoration process of the secret sharing scheme, k2 being a predetermined integer equal to or greater than two and equal to or less than n−1.

* * * * *